United States Patent
Ewington et al.

(10) Patent No.: US 11,971,619 B2
(45) Date of Patent: Apr. 30, 2024

(54) LIGHT VALVE SURFACE IMAGE AND LIGHT BEAM PROJECTOR

(71) Applicant: Sandbox Light Engineering Corporation, Philadelphia, PA (US)

(72) Inventors: Christopher D. Ewington, Manchester (GB); Matthew E. Ward, Philadelphia, PA (US); Jeremy Hochman, Walnut, CA (US)

(73) Assignee: Sandbox Light Engineering Corporation, Philadelphia, PA (US)

( * ) Notice: Subject to any disclaimer, the term of this patent is extended or adjusted under 35 U.S.C. 154(b) by 5 days.

(21) Appl. No.: 17/668,183

(22) Filed: Feb. 9, 2022

(65) Prior Publication Data

US 2023/0251514 A1    Aug. 10, 2023

Related U.S. Application Data

(60) Provisional application No. 63/147,532, filed on Feb. 9, 2021.

(51) Int. Cl.
| | | |
|---|---|---|
| *G02F 1/1333* | (2006.01) | |
| *G02F 1/133* | (2006.01) | |
| *G02F 1/1335* | (2006.01) | |
| *G02F 1/13357* | (2006.01) | |

(52) U.S. Cl.
CPC .... *G02F 1/133308* (2013.01); *G02F 1/13306* (2013.01); *G02F 1/133382* (2013.01); *G02F 1/133528* (2013.01); *G02F 1/133553* (2013.01); *G02F 1/133613* (2021.01); *G02F 1/133603* (2013.01)

(58) Field of Classification Search
CPC ......... G02F 1/133308; G02F 1/133613; G02F 1/13306; G02F 1/133382; G02F 1/133528; G02F 1/133553; G02F 1/133603

USPC .......................................................... 349/56
See application file for complete search history.

(56) References Cited

U.S. PATENT DOCUMENTS

| 4,261,029 A | * | 4/1981 | Mousset ................. F21V 23/02 |
|---|---|---|---|
| | | | 362/346 |
| 2003/0234342 A1 | | 12/2003 | Gaines et al. |
| 2011/0044047 A1 | | 2/2011 | Mandy et al. |
| 2013/0120234 A1 | * | 5/2013 | Atkins ................. G09G 3/3426 |
| | | | 345/102 |
| 2015/0286340 A1 | | 10/2015 | Send et al. |

FOREIGN PATENT DOCUMENTS

EP          2203032 A2    6/2019

OTHER PUBLICATIONS

International Search Report Issued within the Patent Cooperation Treaty International Application No. PCT/US2022/15825, mailed Jul. 20, 2022, 2 pages.

* cited by examiner

*Primary Examiner* — Alexander P Gross
*Assistant Examiner* — William D Peterson
(74) *Attorney, Agent, or Firm* — Schott, P.C.

(57) ABSTRACT

A lighting system and method controls light to prioritize different elements of the beam of light that is output by a fixture. The LCD surface acts as a color occlusion filter that provides pixel level control of the beam of light transmitted by this layer. Internally an LED source is projected perpendicular to concave type reflector which can be moved on one axis and thus zoom to either widen or narrow the light emitted forward as a beam of light. The system also includes certain cooling features.

19 Claims, 27 Drawing Sheets

LIGHT VALVE SURFACE IMAGE AND LIGHT BEAM PROJECTOR

BACKGROUND

Solid state light sources have introduced a range of new options to designers and yet the basic form of the lights themselves has not changed much since the mid-2000's. There are soft lights defined by a plane of LED sources that can be covered by diffusion. But one of the issues with these soft lights is that diffusion is necessary to avoid artifacts created by the multiple light sources arrayed across the front of the fixture. These create stepped shadows that are visible on flat surfaces.

Lighting for film and television is little changed from the 1970's despite the integration of mappable LED fixtures like the Arri Skypanel. While mappable LED fixtures have been around since the mid-2000's they have not managed to overcome the limitations of the multiplicity of sources relying on diffusion to avoid creating multiple shadows. The ability to map these fixtures has outweighed the downsides. Both the Arri Skypanel and LED video displays are often used to animate light and they are effective in a near field environment.

The light from these fixtures, however, goes everywhere. They cannot easily be masked as they are almost Lambertian sources radiating evenly in a hemispheric manner. Good for soft light but not good for creating structured rays of light. For this large video projectors are sometimes used. But video projectors can be limited because they are point sources creating a single bright point of light creating unnatural reflections. Technicians are sometimes working in opposition to the engineering of the optics to create a softer output. But these do solve a problem.

Many productions use large LED displays to digitally create scenery that can be perspective mapped as an output of virtual cameras in game engines. These environments are referred to as the "digital twin" because they often correlate to physical locations or real sets. This phrase has been used for a while but has recently become much more widely known because of the Mandalorian production. In this production, the Unreal Engine was used to create digital backgrounds that may stay in proper perspective as a camera moved creating motion parallax adding a layer of realism to the digital recreation. And where the mapping of lighting is used the sources of light should stay fixed relative to their position in the digital twin. When an actor moves relative to the sun or an artificial source or an object that obscures the source the lighting on the actor should change but this is only possible with a tremendous amount of work on the part of the production team. To make arrays of lights that can be mapped this way is complex and the lighting often needs to be physically adjusted shot for shot.

There are also wash lights that might have LED sources but are still soft zoomable lights. There are profiles that are capable of projecting light and integrating gobos lighting and slides to create textures and static images.

Advances in computing and light sources and new requirements in design and production are calling for a new type of light. These new lights can make use of a variety of existing technologies to offer designers new types of dynamic control. But to achieve this the core technologies need to diverge from the manner they are currently used.

Video projection is a good example. When optimized for the typical video application the key requirements relate to the performance at the screen surface. The level of control required encourages the use of a very small imager. The history of video projection is partially tied to the steady reduction is size of the imager along with increases in optical efficiency and advances in optics and light sources that this facilitated. Some early rear-projection systems used large LCD panels due to the lack of alternatives.

Early LCD rear projection displays were sometimes made using large LCD panels designed for laptops or other high volume commercial displays. By using a large single light source and a fresnel lens it was possible to make a projection system out of these LCDs. This lives on today via hobbyists and also through low-cost video projectors made using LCD displays from smart phone handsets.

LCD displays are well established with brands such as Epson and Sony building on LCD display work that began in the late 1960's. The first LCD based light valves were produced even earlier by Marconi, a part of the company that lived on through acquisition as the English Electric Valve company producing an LCD based product called Starvision.

An LCD display is based on the ability of liquid crystal to modulate light by switching between two states. By using polarizers in the front and back of the liquid crystal it is possible to switch light on and off. With the liquid crystal oriented in one position the screen appears black because front polarizer is blocking that polarity of light. When the liquid crystal cell turns 90 degrees the polarization of the front polarizer and the light align and the display passes the light.

More recently LCD panels have been considered for applications in the automotive industry in order to create steerable headlights.

SUMMARY OF THE EMBODIMENTS

The entertainment industry needs other things from an LCD driven light source including a large emitting surface. The ideal surface may be a spherical array of light field emitters each perfectly replicating the light output that may be originating from that point in space in terms of both form and polarization. This computer controlled mapped wavefront may bathe a scene in light duplicating that of a real space or alternately the light required in a digital representation of a space that is being recreated in camera for a scene in a movie.

Some key elements of a stage light may be driven by this abstracted goal. The system described herein may be able to create light at varying angles and be able to control the output such that only light at the desired angles may be output at any given time.

Currently a stage might be lit with soft lights, wash lights, and video projectors. But none of these individually or in combination can light the stage in such a way that light can be actively controlled. These stages are not making more use of large video display surfaces that are driven by real time game engines that generate the background scenery on a display panel for the camera shot. In this way, what may have been a separate special effects back plate is now captured in camera. But these shots are diminished by the failure of lighting to faithfully represent the environment of the digital scene.

By using a new variant of an LCD lighting system designed not around the video image but around the quality of light created by the light projector, the inventors have created a variety of virtual light sources (the general term used herein for sources of lights may be light sources, though other terms for sources of light are also used). Such a light source, with the ability to change the beam angle and soften or sharpen the light could be used in large arrays to create dynamic virtual light sources. Examples of these may include the sun going behind buildings. The sun going behind hills or trees. A headlight moving across a building the way the sun shines through an open window on an airplane.

This can be created virtually in displays with a game engine like Unreal or Unity (although called a game engine, this content generation engine may create just video output unrelated to gaming). The digital lighting of a scene can be used to create the output of a large virtual light source. This can be integrated with ray tracing by determining what light may be coming from the location of the fixture. That can then be output as a video signal along with the video signals for all the other fixtures as a composited 4K frame. Since each light may have a specific position and orientation in 3D space the output of each fixture could be different. Rather than being a subset of a large image each fixture represents the light that can be recreated from the position of that light. In some ways this is a manner of light field display.

A light field array may be part of the system herein and work with these displays and the game engine. A single unit of light within the overall system's light source has many interesting capabilities but the ability to integrate them into a three-dimensional array in the same manner as volumetric capture and reproduce the complex lighting from inside a digital 3D scene is challenging using existing technologies.

To accomplish this a web of interactions needs to be managed within a system.

First, some lighting information may be available within the game engine, meaning that the game engine itself may have programming that sets lighting and effects.

Second, that lighting information may be supplemented by a number of components in the game engine that are also present in a physical space.

Third, the lighting units in the physical space may be part of the overall mapping system that incorporates not only the virtual space, but also the other physical elements in a scene including display walls, the physical properties of the environment, and the performers inhabiting the environment. This may be integrated across a number of computer servers and may include elements of the system that are in the cloud. The timing between all these elements may be both precise and synchronized with any cameras used to capture the scene.

A system that does this may be able to correctly illuminate an actor in a volume while removing unnecessary stray light impairing the performance of the large display, which already incorporate the digital elements of the light illuminating the performers.

Arrays of lighting instruments described herein may become virtual sources duplicating the natural and artificial lighting elements of an environment. In a simplified description, an array of lights could represent a light source as it moves relative to the subject that is being illuminated.

These system components can support multi-focal outputs through the integration of different LED groups within the center of the reflector. The movement of the different groups can be unified or segmented such that half a lighting instrument is at one beam angle while the other half of the instrument is at another beam angle.

In this way the system can illuminate a naturalistic scene and match the computer-generated lighting in the digital scene. This can be applied to other aspects of lighting allowing dynamic cycloramas and foot lights. The ability of the light source to be motorized and move to adjust the position of the light sources relative to a reflector allows control over beam angle and focus that may be equally compelling in a cyc light or a foot light.

An additional feature may be the ability of a system to track the performer in a scene. This is important for two reasons. The camera (or the audience) is generally focused on the performer. And the lighting of the scene may be judged based on how that performer is illuminated. But the total amount of resolution available for this function may always be finite. To focus on the performer, it may be desirable to deemphasize the lighting in the scene that is not focused on the performer. In this way a single 4K (3840×2160) output might dedicate 1920×1920 to the performer while using the remaining resolution to drive the lighting illuminating the rest of the scene. And this 1920×1920 area of interest may want to track the performer meaning that the lights getting high resolution information and the lightings getting low resolution information may change dynamically over the course of a scene.

In addition to this, the digital mask that prevents the lights from hitting the large displays used in virtual production may be composed in the high-resolution area of interest while the area outside of the mask may generally be the low-resolution information going to lights that are not hitting the performers. In order for the tracking to be smooth the lights need to operate in the range of 240-480 Hz but it is possible that the mask may follow the performer at 240-480 Hz while the high-resolution content on the performers is only rendered at 60-120 Hz. This may improve the appearance of the tracking and the masking of light off the display screen.

This mask may be created locally at the fixture using sensors integrated into the light (also called a light source herein at times). This system may make a 2D mask that defines active and inactive areas of a projected light source. A lighting texture map representing the projected light field is generated using the same sensor data or other available data is generated in a second content engine. The latency and frame rate of the two layers may not be locked meaning that the 2D mask can update at a higher refresh rate with lower latency while the texture map is updated with slightly more latency at a lower frame rate. The output of the fixture may be a composite of these two feeds with the mask tracking the subject at low latency while the projected content lags slightly. The resulting lighting effect is superior to current options since it minimizes light on the LED wall while more accurately rendering the light in the scene so that the camera capture more holistically represents the vision of the filmmaker/creative director.

The sensors for this may be external however the sensors may also be integrated into the center of the light either in front of or behind the light modulating surface at the front of the light.

The light may also incorporate a polarized filter and this filter may be adjusted to improve the performance of the light when used with various specular materials and polarization filters.

In order to use a light in planar mapped arrays it may be necessary to match color across fixtures. This may be possible with calibration since both the color temperature of the light source and the color characteristics of the front light modulator can be known in the abstract and they can be determined in a closed loop calibration system during manufacturing and as part of service and maintenance of the lights.

It is possible to apply this system to existing lights by creating an accessory module that can be placed in the focal plane of an existing instrument to create a dynamic gobo and to offer some, but not all, features of the purpose-built fixtures.

In some cases, the thermal management of the fixture may be integrated directly into the accessory as the light modulator may be thermally sensitive. In this instance it is possible that a polarization recycling prism can be used as a thermal break to isolate the light source from the light modulator and simultaneously improve optical efficiency. The prism may create a thermal break between the light source and the LCD and allow for closed loop or ambient convective cooling to keep the liquid crystal within the necessary operating range.

Going forward it may be desirable duplicate these capabilities in planar light fixtures like current soft lights. These lights are often ideal for near field applications where the light source is close to the subject of the light. Eventually light field displays may perform this role but until then users may still value the ability to dynamically control the beam angle of each ray of light output from the system. This can be achieved with a wedge optic and a diffractive or holographic light guide.

Such a system could integrate an anamorphic lens for the imager to increase the resolution along one axis. Such a system might be able to combine smaller imagers with distributed laser phosphor sources to create such an array.

Such a light may require a complete network connection internally so that the sensor data and the distributed processing required to deliver the high frame rate lighting solution may not be encumbered by the limitations of a local controller. Having a network switch in each light with separate paths for the control of the light, the sensor integration, and any local processing allows for the asynchronous integration of all these elements.

The light may also include a GPU to compute the mask requirements locally. This local GPU system may ingest the distributed video map from the media server and composite it into the output such that the mask is optimized by the highest frame rate possible for the light modulator while the content may only be limited by the highest frequency output from the source. This source can be a generic game engine or a specially developed media server. In each case it is likely that the limitations of the data path between the source and the light may be more constrained than the limitations between the local compute system and the light modulating panel. The system may be optimized around this to support the smoothest possible tracking.

DETAILED DESCRIPTION OF THE EMBODIMENTS

Introduction

Figure 1:
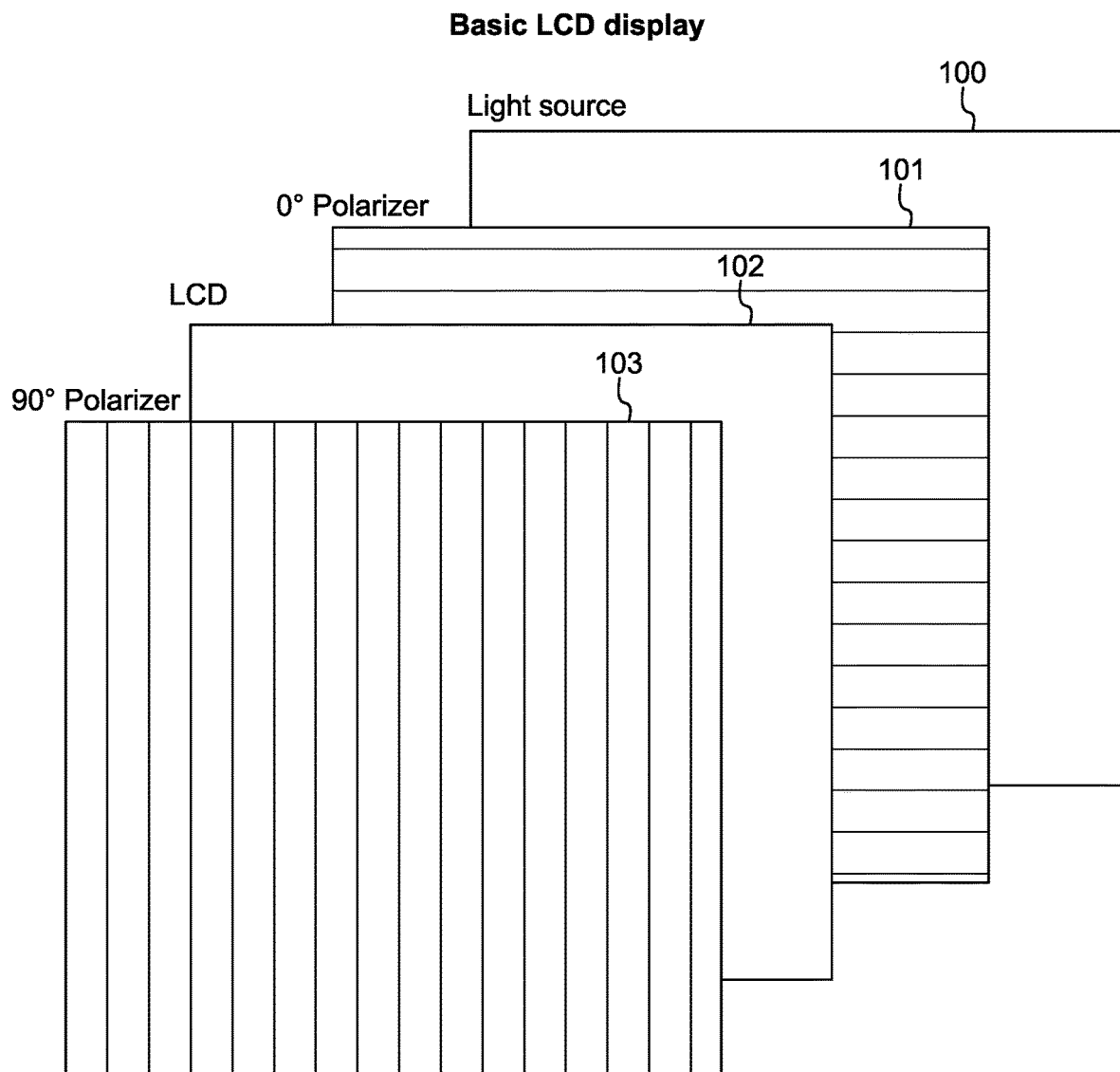
FIG. 1 shows a typical LCD display.

A Light Valve Surface Image and Light Beam Projector

It is an objective of the present invention to provide both a visual animated surface image as well as a projected beam of light in order to create a final visual image that presents well to a user. An element of a system to achieve this goal may be a light source with one face of a fixed position or motorized moving cube that is equipped with a recessed mechanical frame surrounding the emitting surface that acts as a protective cowl. Set back in this frame may be an LCD Panel. This panel may comprise a matrix of pixels. Collectively a 960×960-pixel surface creates a 2d surface of a suitably high contrast ratio no less than 3500:1 ratio. This Liquid Crystal Display (LCD) by its physical embodiment, acts as a light source with a light value. With the present system, the light projected from within the light source may travel forward as a computer-controllable beam of light.

Pivoting Gimbal Mechanical Construction

It is another objective of the present invention to move the projected beam of light, within the confines of a pivoting gimbal mechanical light source cube. The movement attributes can be remotely controlled via external computer control to affect a proportional movement in two axes. Namely a pan movement with total rotation of more no more than 540° and 250° of the tilt axis, which when combined offer effectively three axis movement.

Optical System

It may also be advantageous to control the emitted beam of light, by affecting the width. With remote proportional motorized control of this zoom attribute. The beam width can be quickly adjusted from 140° down to a narrow 4°. The beam of light can also be inverted to provide up to minus 90°. Within the moving body (namely a gimbal cube), the LED light source may be projected backwards into the moving squared parabola or spherical or concave reflector. This highly reflective mirror collimates or concentrates the light emitted from the diodes through the LCD occlusion layer. The resultant light may be projected forwards. Furthermore, as the overall surface of the LCD substrate may be obstructed by a central light emitting light source, and a second forward facing LED light source may replace the obstructed or lost surface light in the center of the LCD panel, to maintain full light uniformity across the LCD substrate, when viewed directly or indirectly

Air Cooling System

LCD substrates may have an optimal operating temperature that under normal backlighting conditions is suitable for high ambient continuous use. Another feature of the present system relates to the exceptionally high backlight conditions. The present embodiment continuously reduces the buildup of heat as the photons of light which are created internally in a sealed environment, emitted and partially absorbed or reflected by the nature of the LCD substrate design. An internal radiant heat exchange system may capture the buildup of radiant heat created by the LED light source. Whereas up to 30% of the total heat generated in the light creation process is emitted forward within the light beam. A plurality of radiators with fans attached push and pull the air within the moving cube. This produces a moving sheet of air which traverses over the internal face of the LCD substrate by way of internal air conduits formed from the creation of an internal metal box construction which guide the air from the bottom to the top of the inside face of the LCD substrate and following the direction of travel as with gravity.

Liquid Cooling System

Another embodiment of the present system may include a feature that the moving cube is substantially sealed from external ingress of particulates and moisture. With a powerful and highly dense LED lighting array, the light source may be cooled via a liquid cooling integrated system. This liquid cooling system may run well below normal freezing point. The liquid is pumped via a dual redundancy impeller pump system. The effect of this cooling system is to shunt the liquid through the LED assembly. Mounted to one axis, a manifold is attached to a singular inner and outer tube immediately behind the reflector. This may be located in the center of the optical reflector component. The liquid cooling system extracts the radiant heat by including the air-cooling radiators within the system located in the motorized moving design. Furthermore, the liquid coolant enters both sides to the tilt pivot points and is routed through the singe pan pivot point to the mechanically static base. Radiators in the base are force air cooled direct to atmosphere, thus removing the heat from the system. This closed loop liquid cooling system may run through a universal orientation liquid reservoir before re-circulating and repeating.

Electronic Real-Time Internal Sensing and Remote Monitoring

Another embodiment concerns the deployment of a range of electronic sensors. These sensors provide an accurate real-time state of the internal functions. This sensory information is capable of remote analysis via a duplex data connection to a local external computer, remote application or distant monitoring station located at the manufacturer's headquarters. The system can provide remote analysis and advise on possible technical issues which may arise from arduous operating conditions.

System critical sensing includes LED temperature monitoring. A rise may indicate flaws to the integrated liquid cooling system such as pump failure, fan failure. Within the fixed base an anemometer measures the airflow going through the plurality of radiators which are located within the fixed base. With due consideration the systems weak link may be in connection with the buildup of lint and particulates bound together on the radiators surface from the condensation of smoke fluid. This is a common occurrence with stage lights that are close to such smoke emitting devices. Because of the forced air movement permitted by the radiators, this unwanted particulate build up impairs the normal air flow which in turn reduces the liquid cooling system which may lead to a core temperature rise. Under normal circumstances this may only become obvious if the system overheated. With our sensor array, there are several points of reference water, ambient and screen surface temperature alerting us to a slow decline in optimal performance. Another sense function includes battery charging status for the universal battery backup fitted within the present invention.

Asset Monitoring System

With a good range of electronic sensors located within the system, these sensors may disseminate this information in several forms. Localized to the present environment whereas an engineer skilled in the art or the creatives in control of the product via a remote computer can be alerted of a problem via the Remote Device Management form of DMX (RDM DMX). When the system is connected to a data network, the device may 'ping' or send sensor information back to the manufacturer, as well as the asset owners, to provide a detailed real-time picture of the products performance.

Electronic Power Supply Backup

Another feature of the present embodiment may provide a universal battery backup in the event of power failure in certain arduous environmental operating conditions such as outdoor stages. If accidental loss of power happens, the loss of time in re-booting or energizing the system can be removed by providing a universal battery backup. When used this maintains internal power for system critical electronic processes. If mains power fails to the device, rather than a complete catastrophic failure, this present invention issues a power fail signal to the local operatives, by way of a flashing visible warning triangle on the touch screen graphical user interface that provides local control located on the device. Furthermore, by way of several different data protocols, this system may alert the user to power failure at the external computer used in the remote control.

Modular Fixed Base Electronics Architecture

The system can be equipped with alternate electronic components to allow maximum versatility especially with the image processing for the LCD substrate. Generally, it may be desirable to have several different data inputs that suit different applications. Similar in setup as with standard rack mounting systems, the 1 U miniature width rack space provides for fiber optic high data transfer distribution.

Furthermore, the control of the video image being transmitted to the LCD substrate can be controlled either externally from video source such as SDI data protocol or to run internally from an internal DMX controlled graphics engine. This engine may also act as a localized video scaler. With the ability to adjust pixel resolution to suit different applications, the DMX-controlled internal graphics engine video and lighting signal can be sent to adjacent fixtures acting as a master with the adjacent fixtures acting as slave.

This internal graphics engine may remove the need for external video signals and subsequent skills from people skilled in the art of video content production. By delivering video content direct to the LCD screen by means of internal production of video content in a generative manner. These internal video attributes are fully controlled directly from just DMX lighting signal, received from an external computer. The above electronic requirement options can be installed or removed due to the modular mechanical architecture that embodies the fixed base of this system.

Description

Display systems using liquid crystal displays as a light source may comprise a liquid crystal matrix sandwiched between a front polarizer and a rear polarizer as shown in FIG. 1. The light source 100 can be solid state or conventional. This light source 100 passes through a first linear polarizer 101 placed between the light source 100 and the liquid crystal display 102. Light primarily of one polarization is then passing through the LCD 102. This light is directed through a second linear polarizer 103 that is rotated ninety degrees from the first linear polarizer 101. This allows the display to switch the light on and off.

Figure 2:
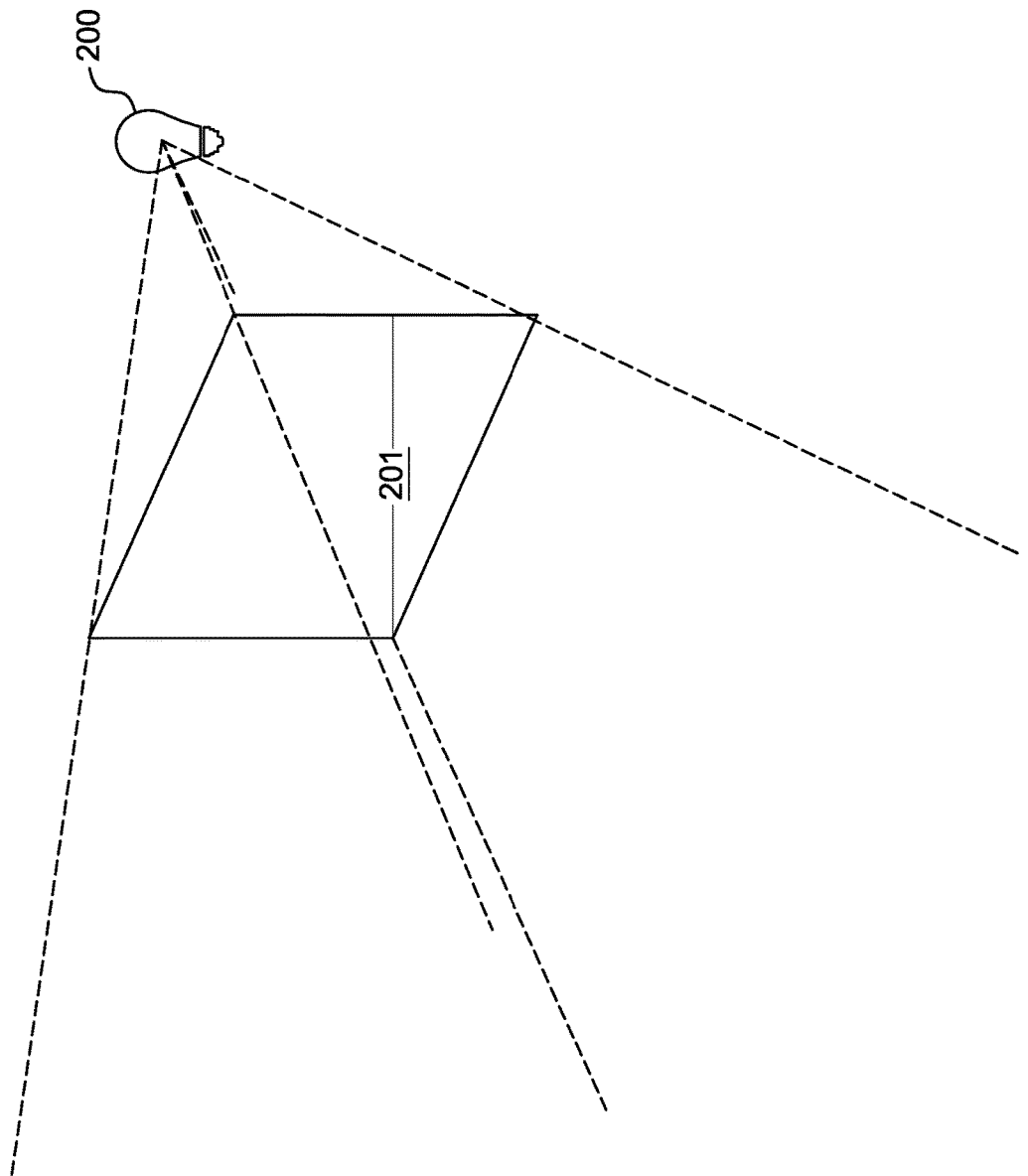
FIG. 2 shows an LCD as a modulator of light.

Liquid crystal is an established modulator of light with a long history in segment displays, panel displays, and in video projection. Many early projectors used typical LCD panels and there is an established hobbyist community that uses 15-20" diagonal LCD displays to make home projection systems set up similarly to that shown in FIG. 2. In some cases, this is as simple as placing a standard light bulb 200 behind the liquid crystal display 201.

Figure 3:
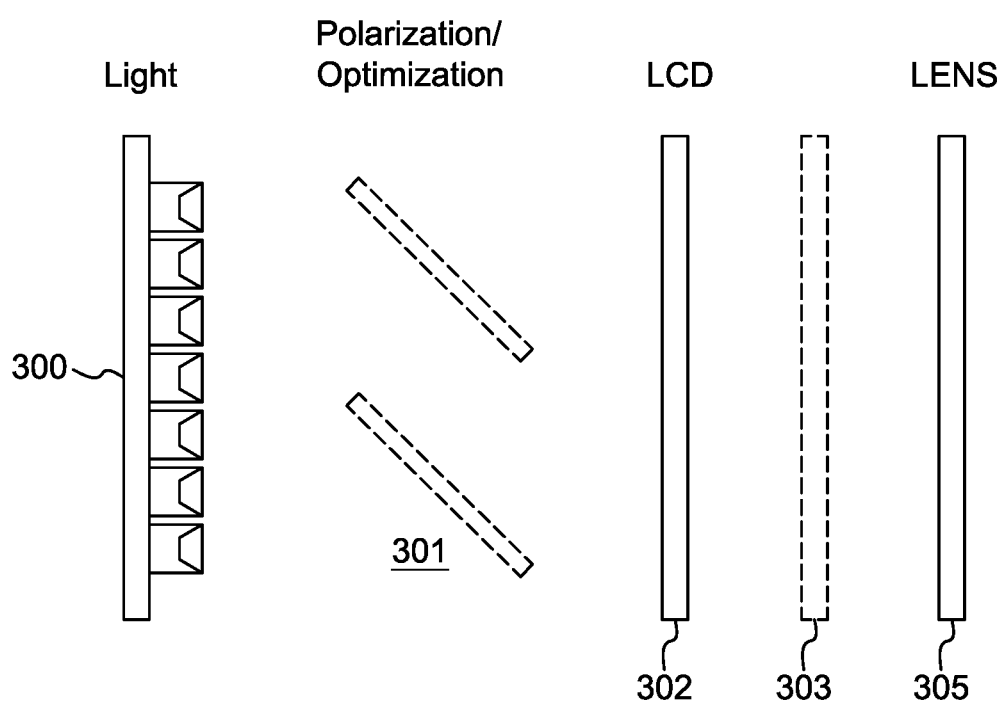
FIG. 3 shows emerging LCD applications.

Liquid crystal displays are being considered for new applications where the dynamic steering of light is critical. One such application is the European Union's VoLiFa program as depicted in FIG. 3, where a liquid crystal matrix 302 is used to control the output of an automobile headlamp. Such a headlamp uses an array of light emitting diodes 300 to project light through a polarizer 301 before passing through the liquid crystal display 302 and a second polarizer 305. A lens 305 is then used to control the output of the headlamp.

Lighting for film and television is little changed from the 1970's despite the integration of mappable LED fixtures like the Arri Skypanel. While mappable LED fixtures have been around since the mid-2000's they have not managed to overcome the limitations of the multiplicity of sources relying on diffusion to avoid creating multiple shadows. The ability to map these fixtures has outweighed the downsides. Both the Arri Skypanel and LED video displays are often used to animate light and they are effective in a near field environment.

Figure 4:
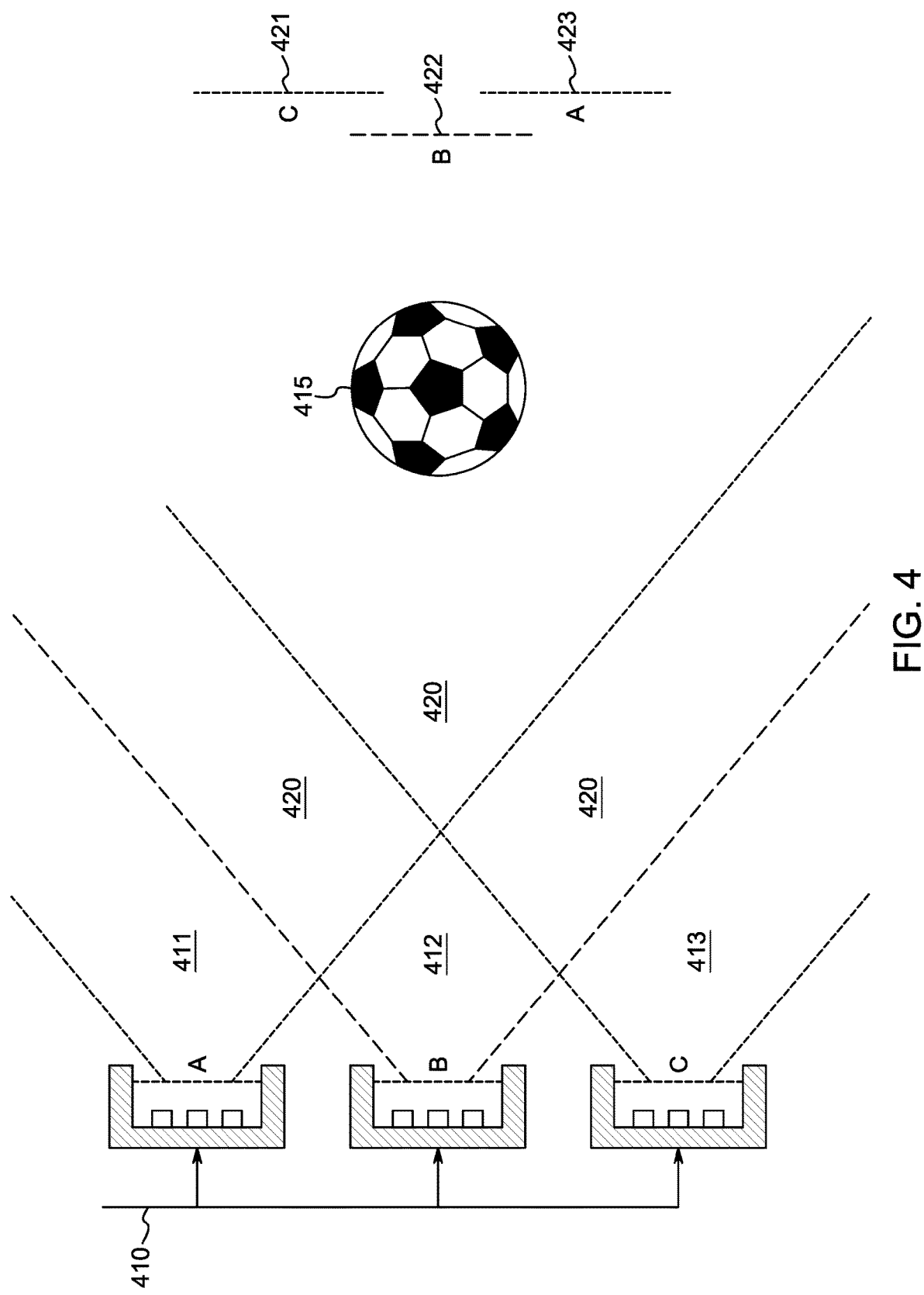
FIG. 4 shows a lighting approach.

A typical LED fixture as shown in FIG. 4 may include a grid of light emitting diode packages 410. These packages can be surface mount packages or DIP packages. They can also be high power packages. Each of these LED packages outputs light across a specific beam angle 411, 412, 413 and across the array these beam angles overlap 420. There is also color shift because the LED dies have different beam angles. The effect of these overlapping light sources A, B, C hitting an object 415 is a multitude of shadows 421, 422, 423.

The problem is that light from these fixtures goes everywhere. They cannot easily be masked as they are almost Lambertian sources radiating evenly in a hemispheric manner. This may be good for soft light but not as good for creating structured rays of light. For this large video projectors are sometimes used. But video projectors can be limited because they are point sources creating a single bright point of light creating unnatural reflections. Technicians are sometimes working in opposition to the engineering of the optics to create a softer output.

Many productions are using large LED displays to digitally create scenery that can be perspective mapped as an output of virtual cameras in game engines. This has been used for a while but has recently become much more widely known because of the Mandalorian production. In this production Unreal Engine was used to create digital backgrounds that may stay in proper perspective as a camera moved creating motion parallax adding a layer of realism to the digital recreation. And the mapping of lighting is used as the sources of light should stay fixed but this is only really possible with a tremendous amount of work on the part of the production team. To make arrays of lights that can be mapped this way is complex and the lighting often needs to be physically adjusted shot for shot.

Figure 5:
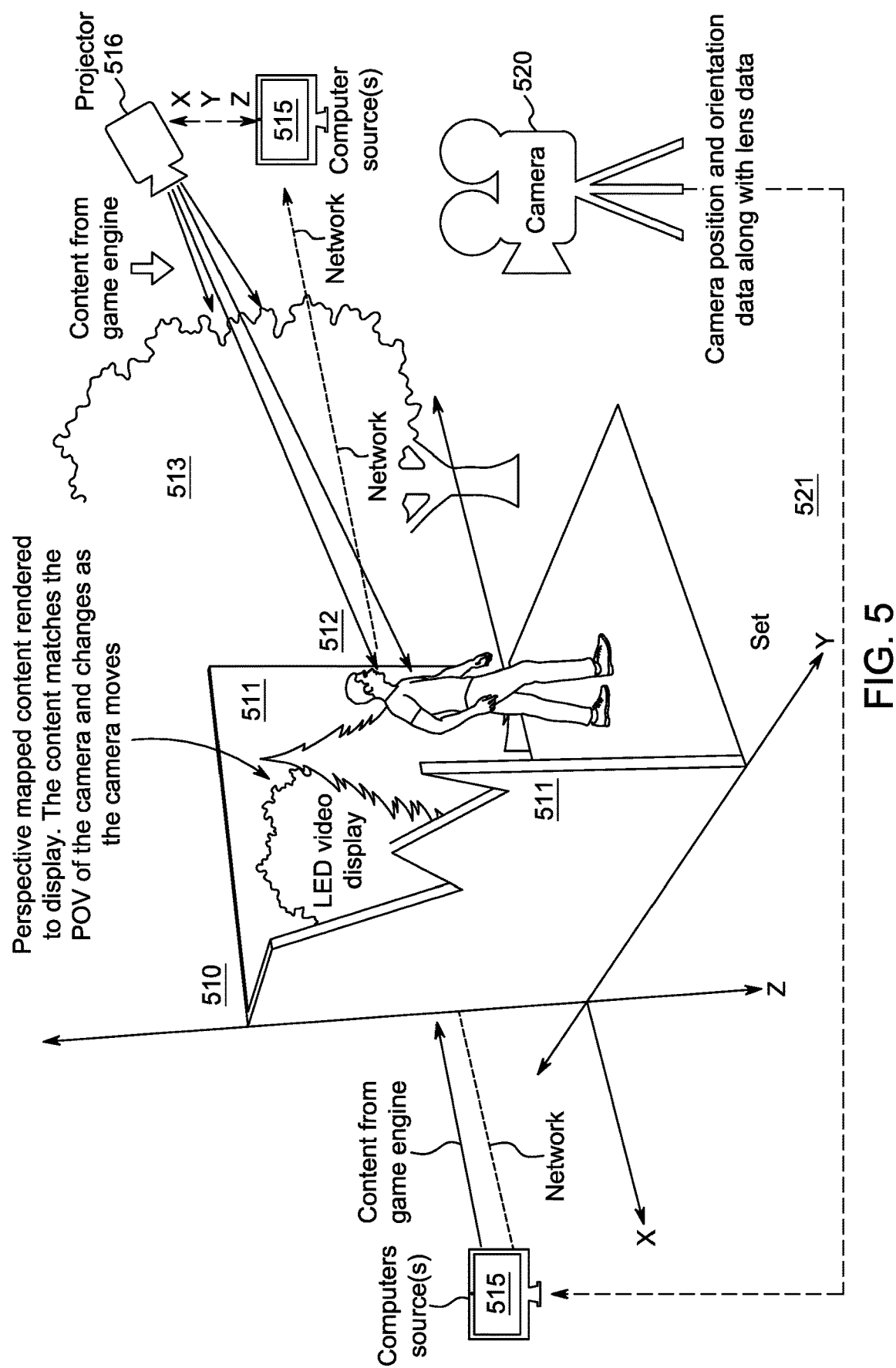
FIG. 5 shows virtual production volume with projector.

FIG. 5 shows an overview of the mapped lighting system 500 where certain virtual production volumes have different lighting requirements than typical stages. The lighting design may be fully integrated with the content output from a computer source 515 that is driving the LED video displays 511. These displays 511 are being fed perspective mapped content that is tracking the movement of the camera 520. There has been some experimentation with video projectors as a light source in LED volumes used for virtual production. But video projectors are point sources with directional beam of light and so they are not ideal for this application. Video projectors have a long history in film and TV production where they have been used for process shots where the reflected output of the projector is used.

A virtual production volume 510 may include of a large array of light emitting diode based display panels 511 that can be curved or some form of truncated cone such that the camera 520 is capable moving within the LED display space. It is possible to extend the image beyond the edges of the LED display 512 and generate content 513 in the finished work using set extension. This content is generated by computers 515 that are tracking the movement of the camera 520 and relaying that data to the computers. The computers 515 can output video and graphical content that is composed based on the movement data to any type of display or system that can be managed as an output of the display or data ports in the computer 515. In this way and as described below, the computer(s) 515 act as a source of real time data within the invention, monitoring camera and object movement, controlling illumination output in light sources, and content delivered to the display panels.—keeping them all in sync to generate an output visualization to the camera that a viewer perceives as "normal."

A very high frame rate system between 240 and 960 hertz can be controlled directly from the data bus of the motherboard. The system can also make use of a dynamic refresh rate that might change depending on the content in each pixel. A projector 516 can be used in this way as a light source much in the same way projectors are used in projection mapping. But since light from a video projector is a hard edged point source it may not be ideal for most film and TV applications.

Figure 6:
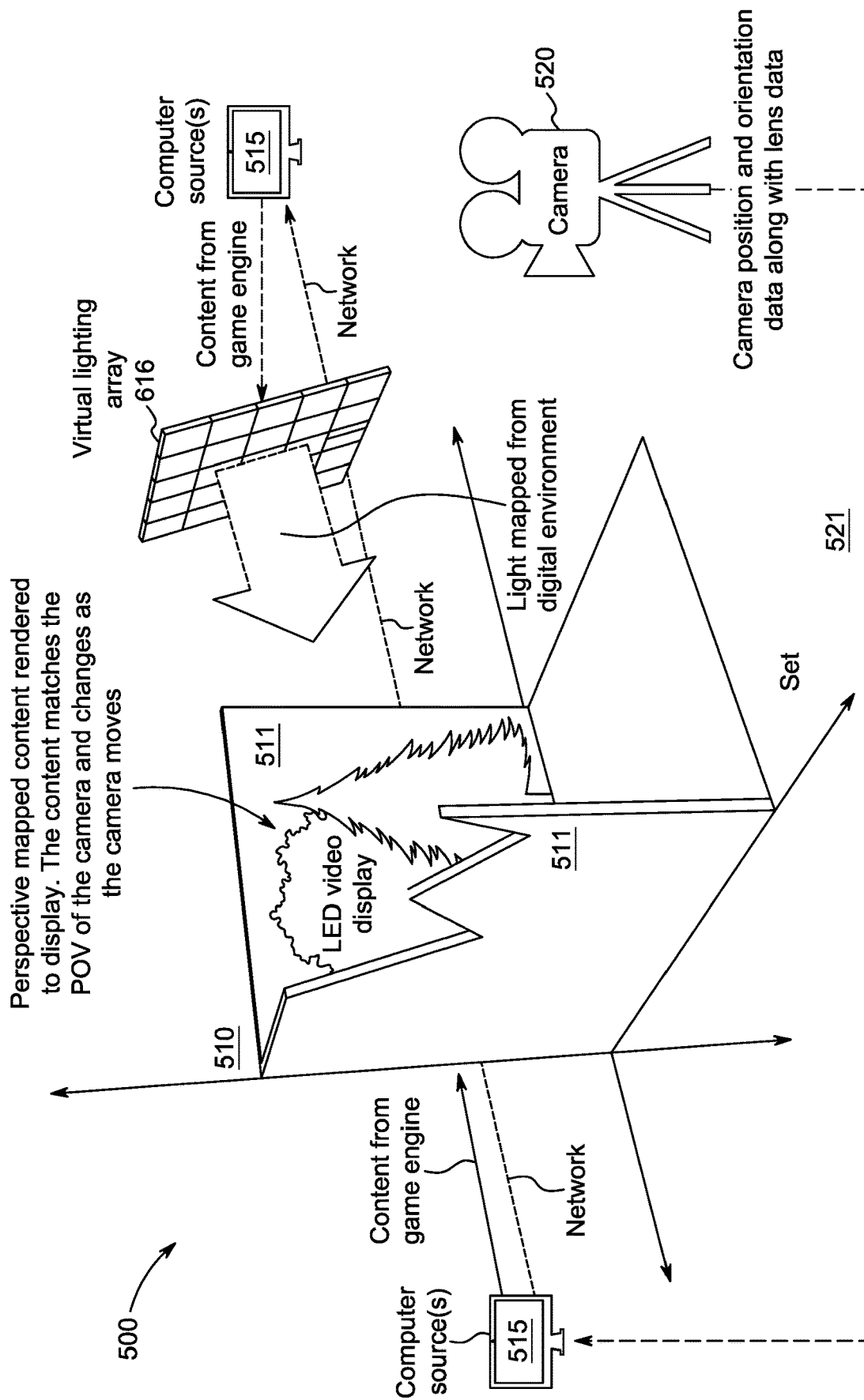
FIG. 6 shows virtual production volume with LCD system.

A light source for film and TV production may be capable of reproducing different beam angles as shown in FIG. 6. Such a system may be capable of reproducing light from a range of environments. This can be driven by the same real time content engine computer 515 that is generating the content for the LED walls 511. In this example in FIG. 6, however, the Virtual Lighting Array 616 can output a variety of ambient lighting appropriate for the environment (in the example shown, a wooded environment). This lighting changes as the camera 520 moves, which maintain the correct perspective mapped lighting for the shot. In this way the lighting is consistent with the background video content on the LED walls 511. Such a system might also be used with a green screen or with a range of accessories designed to further control the light distribution. A virtual lighting array 616 can also include a freeform array of fixtures that surrounds a volume although this may have limits.

Figure 7:
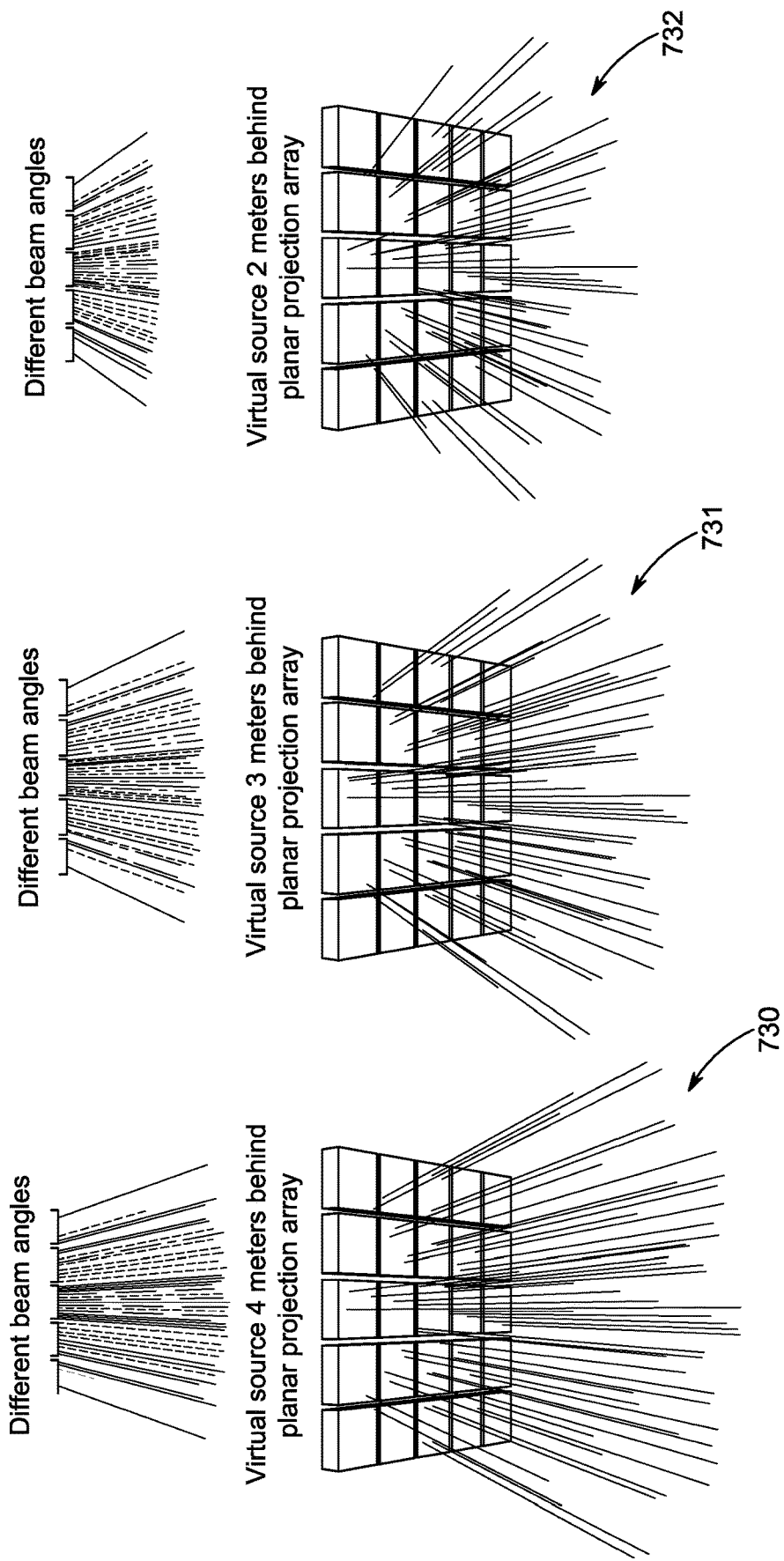
FIG. 7 shows LCD as a light source.

By using an array of fixtures of the system described, it is possible to create a virtual lighting array light source as shown in FIG. 7 that can represent different types of light sources in a shot. Three different beam angles are illustrated but a range of symmetrical and asymmetrical patterns can be achieved. The illustration shows a source 2 meters behind the front plane of the light array 732, 3 meters behind the front plane of the light array 731, and 4 meters behind the front plane of the light array 730. This can be adjusted dynamically such that the source is moving closer or further from the front emitting plane of the virtual array.

Figure 8:
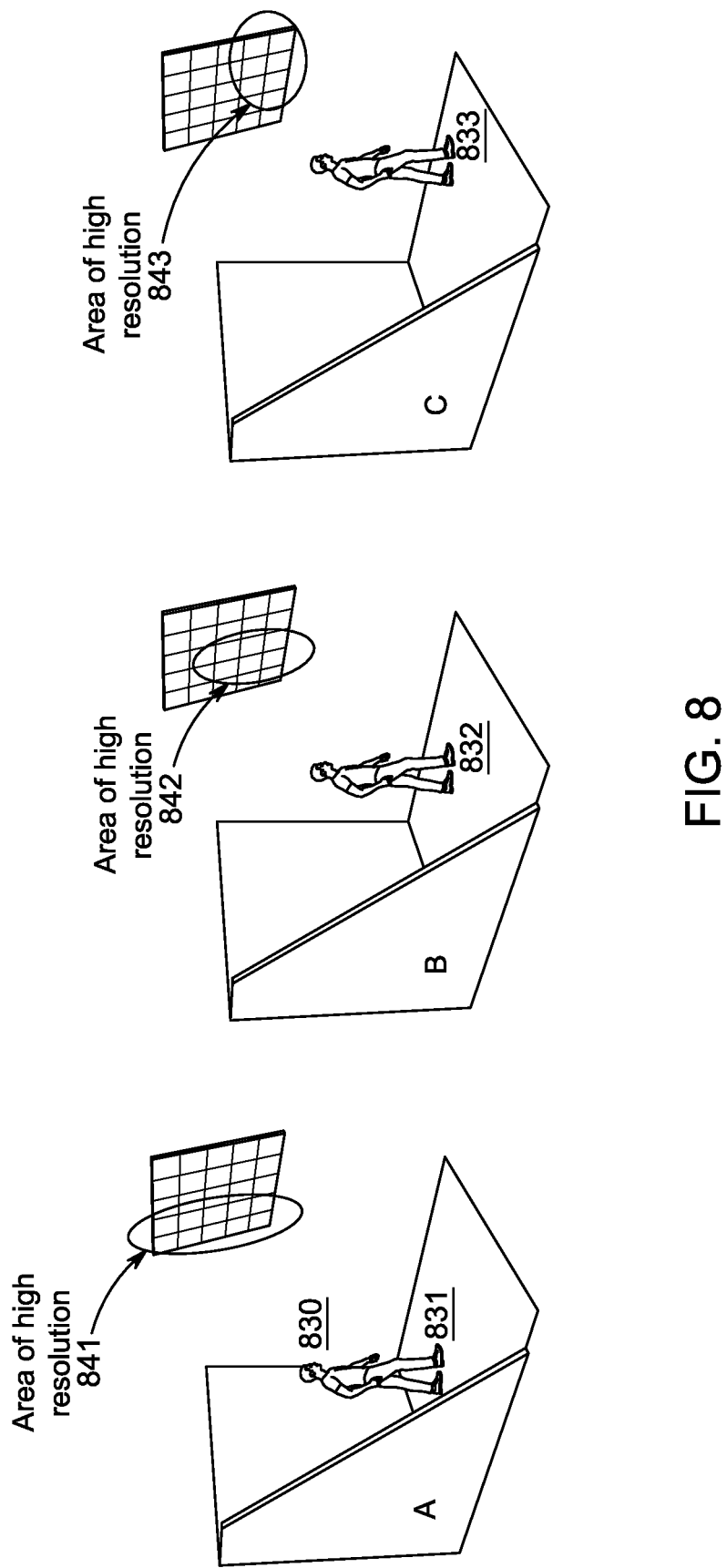
FIG. 8 shows variable resolution in LCD arrays.

Another feature of the system is the ability vary resolution across the array as shown in FIG. 8 so that real time computing power and network bandwidth are conserved for the area that is the focus at that moment. As the actor 830 in the set volume moves from the back of the volume 831 to the middle of the volume 832 and out to the front of the volume 833, the area of high resolution content moves from the left side of the virtual lighting array A 841 to the lower center of virtual lighting array B 842 and on to the lower right side of the virtual lighting array C 843.

Figure 9:
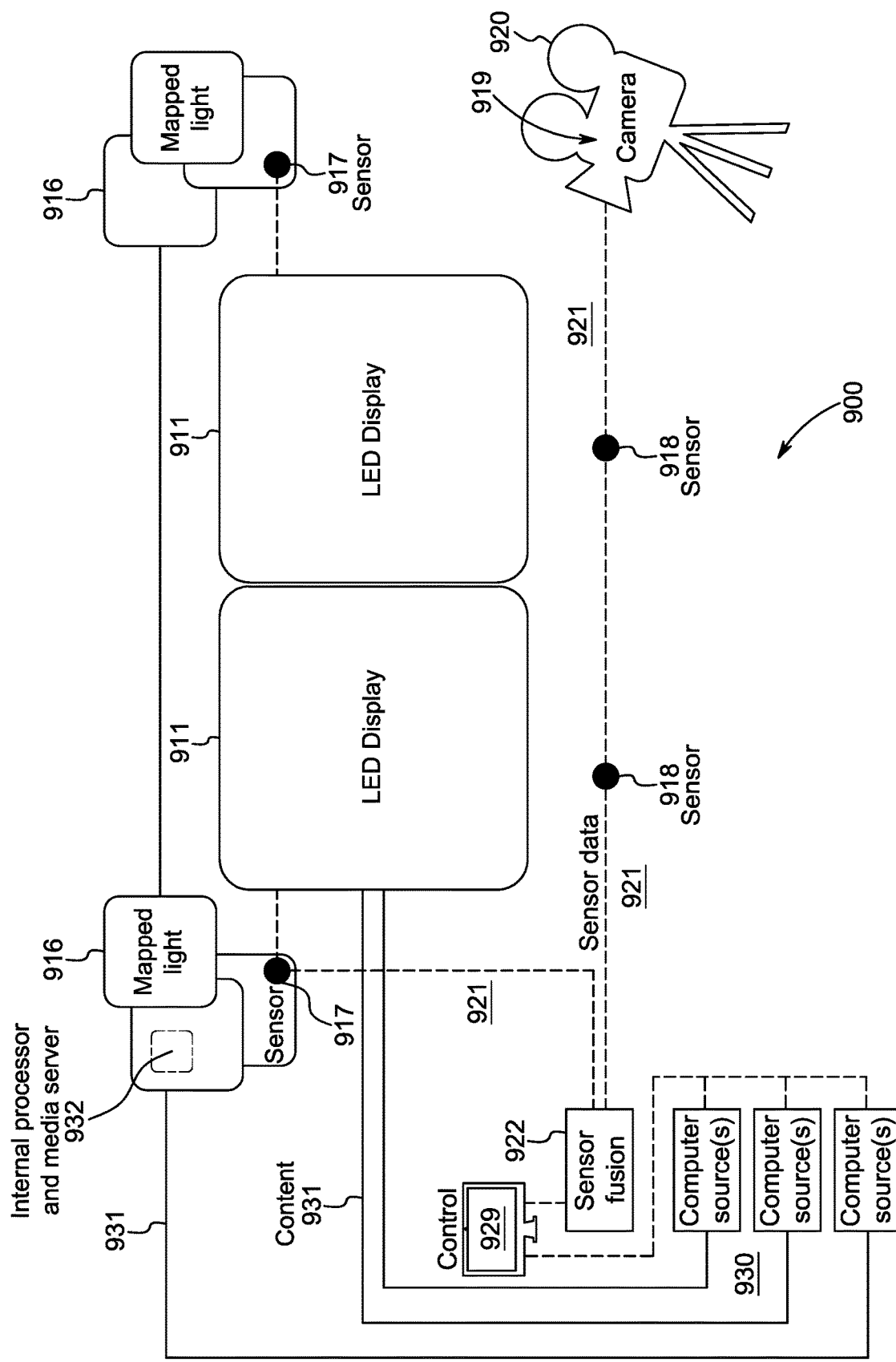
FIG. 9 shows system topology.

Virtual production systems shown in FIG. 9 include of a mix of sources, sensors, and processors in addition to the displays, lights, and cameras. These systems may also track the precise position of the actors in the volume for motion capture and additional special effects work. The light described in this system easily meshes into these systems. The lights may also include sensors, processors, and real time content engines. The need to manage timing and reduce latency in film and TV production is critical. The display and lighting systems may all refresh at a speed that works with the cameras. Color may also be controlled across the systems. The color temperature and spectral distribution of the light sources is critical and may be reviewed to avoid metamerism—the fact that reflected light is different based on the spectral components of the light source.

The virtual production system 900 includes light emitting diode displays 911 that may include walls, ceilings, and floors. This display system is driven by one or more computers 930 capable of generating the content 931 required by the client. This system may have a separate control system 929 and a separate means of integrating the sensor data 921. Sensor inputs range from tracking devices 918 in the volume to systems tracking lens movement and camera position 919 to sensors 917 integrated into the mapped lighting system. Some sensor data may be used locally 932 to reduce latency and generate all or part of the content driving the mapped lighting system light source 916.

Figure 10:
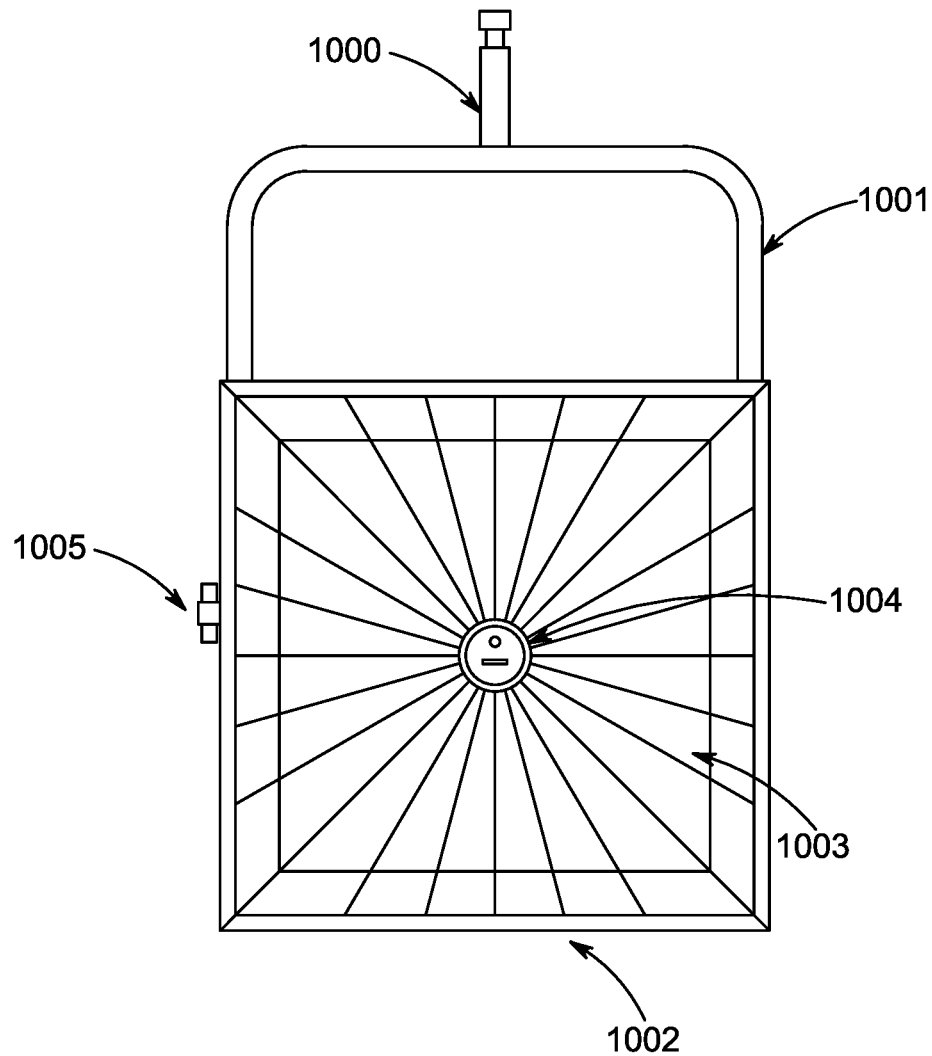
FIG. 10 shows a front view of proposed design.

The lighting fixtures as light sources may be integrated into installations in a variety of ways. The design may need to accommodate different types of physical connections as shown in FIG. 10. A fixed rigging point 1000 may be provided by way of a 12 mm/½" hole to which a (shown) scaffold clamp/gas pipe component can be fitted to enable a swivel point/pan point. A static hanging frame/yoke 1001 may be provided with a 25 mm/1 '2" tubular frame. This frame 1001 may be fitted to the main chassis of this device, this yoke 1001 may be capable of removal to enable the device to be used in a different setting (shown below).

When used as a lighting fixture normally referred to as a wash light, it may be desirable to equip this device with an anti-glare radial baffle 1002. This baffle 1002 reduces off axis lighting glare common from devices of this nature that emit light forwards in a beam. Radial fine 1003 are positioned in circular radiating pattern so as to provide as much masking of unwanted light. Given that this device has a variable beam of light from roughly 4° through to over +60°, the surrounding frames 1002 is angled at 30° so as not to interrupt the beam of light when at its widest possible angle.

Located in the center of the anti-glare baffle 1002 may be a 1004 lidar sensor. This sensor 1004 provides a machine vision perspective that is fed back to the image processing electronics and computer, sensing the volumetric space within this device's field of illumination.

Figure 11:
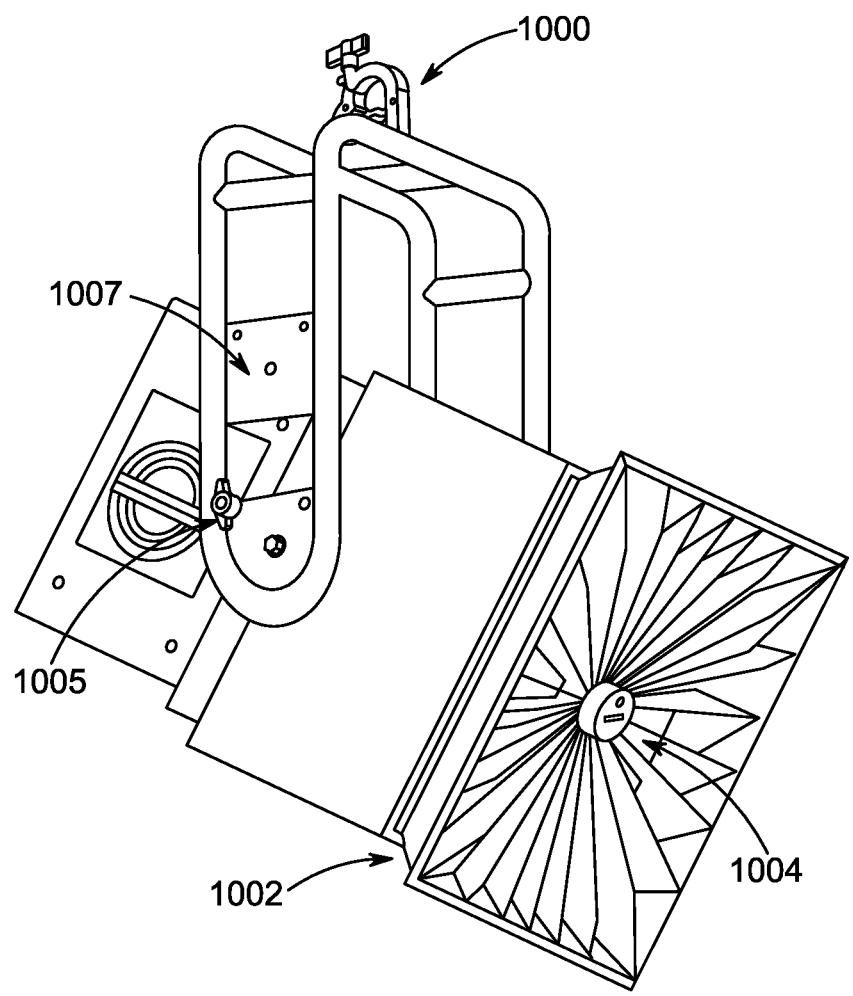
FIG. 11 shows a side view of proposed design.
Figure 12:
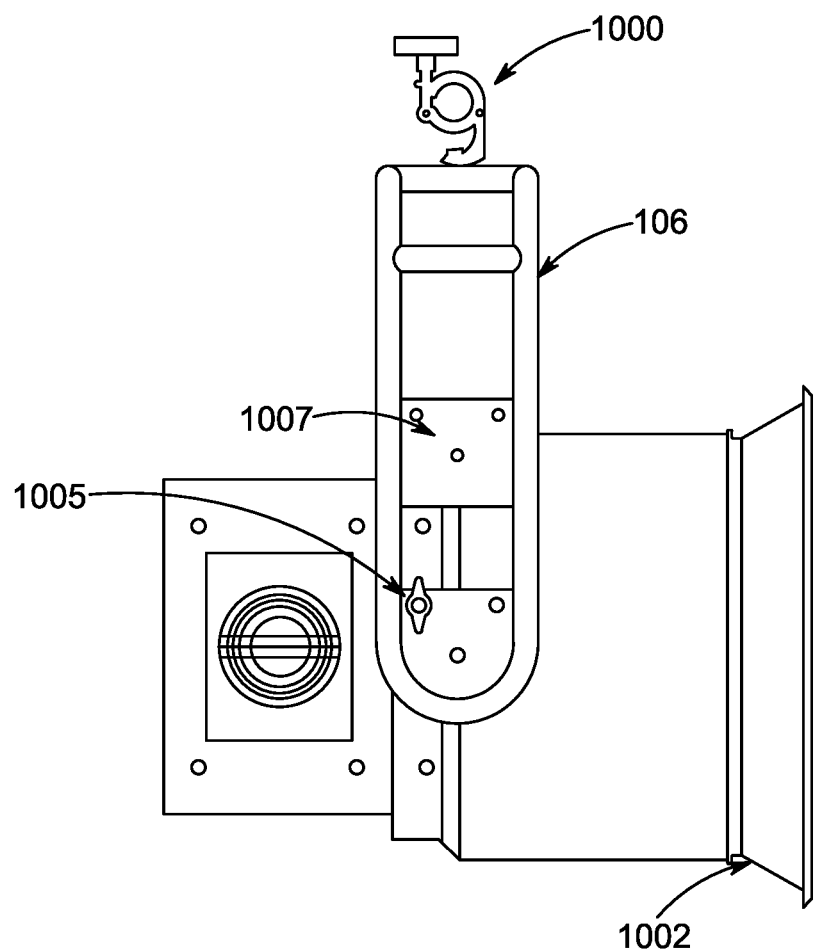
FIG. 12 shows a perspective view of proposed design with yoke.

A positive lock off knob 1005 is shown in FIG. 11, enabling a firm fixing of the vertical tilt function. FIG. 12 shows two horizontal fitted tubes 1006 within the yoke frame that provide a carry handle for the user. Furthermore, a second yoke main pivot point 1007 is provided, which can be used when ceiling heights are restricted. This second pivot point 1007 reduces the gap between the device and the yoke 1001, which under normal operation can swivel all the way round so the device can be positioned on the floor and pointed upwards.

Figure 13:
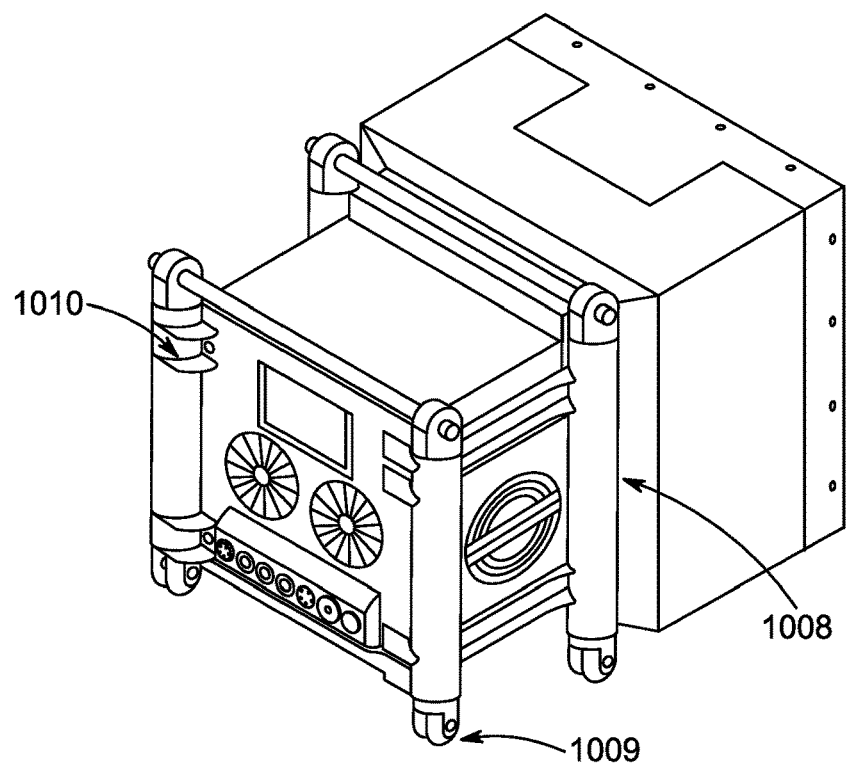
FIG. 13 shows a perspective view of rear of proposed design.
Figure 14:
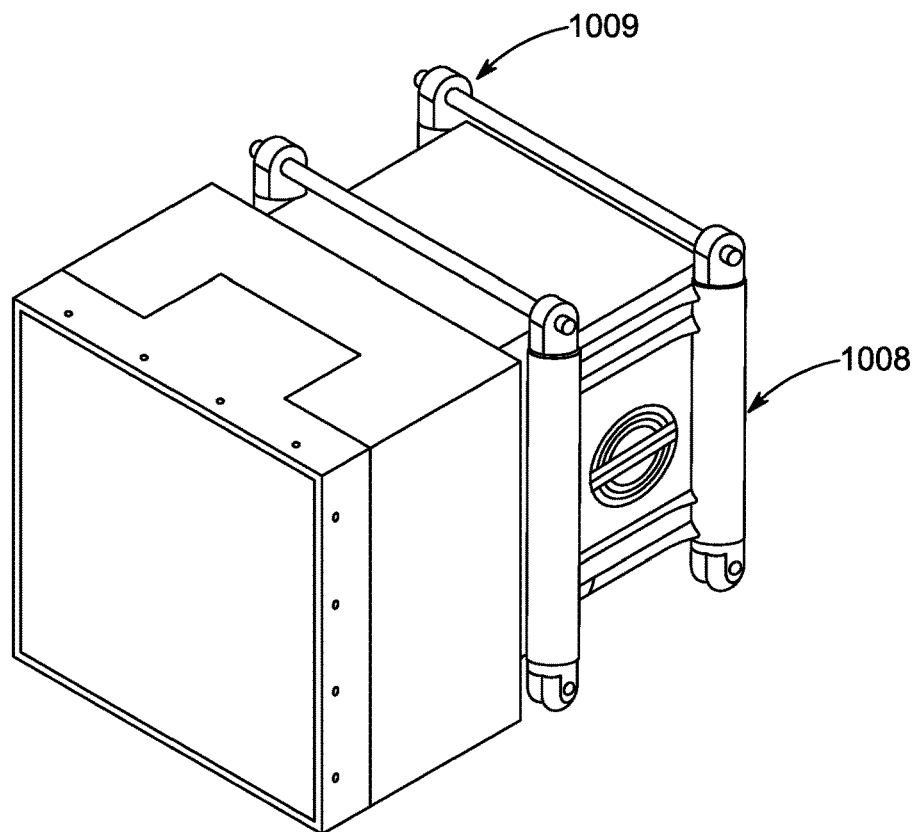
FIG. 14 shows a perspective view of front of proposed design.
Figure 15:
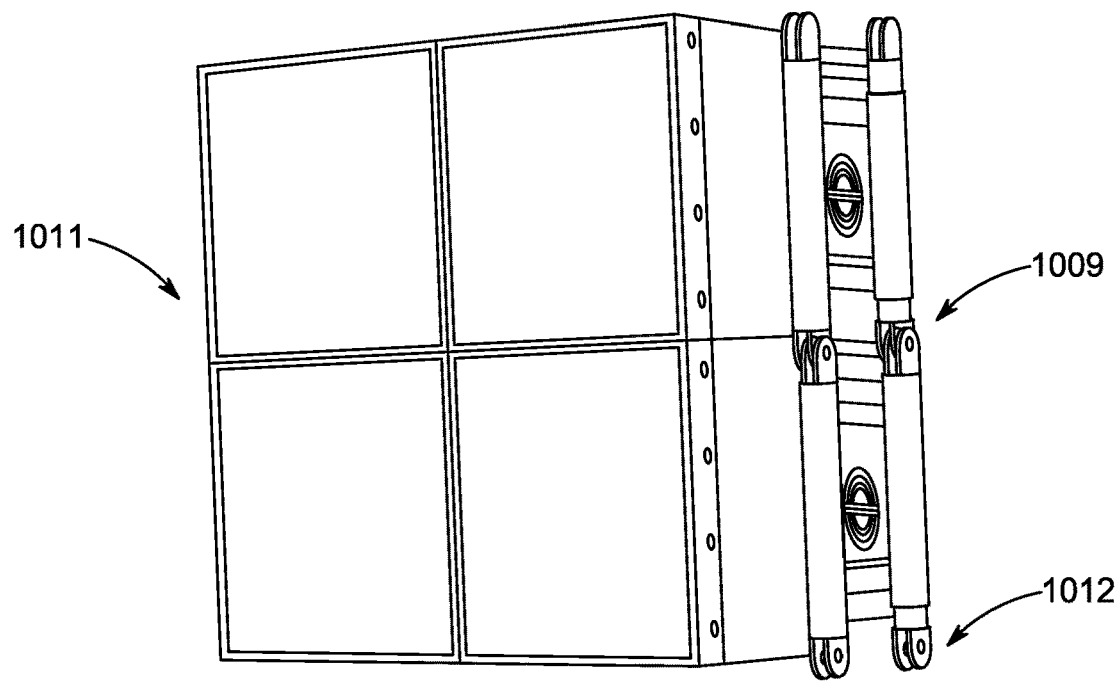
FIG. 15 shows an array of fixtures—front perspective.
Figure 16:
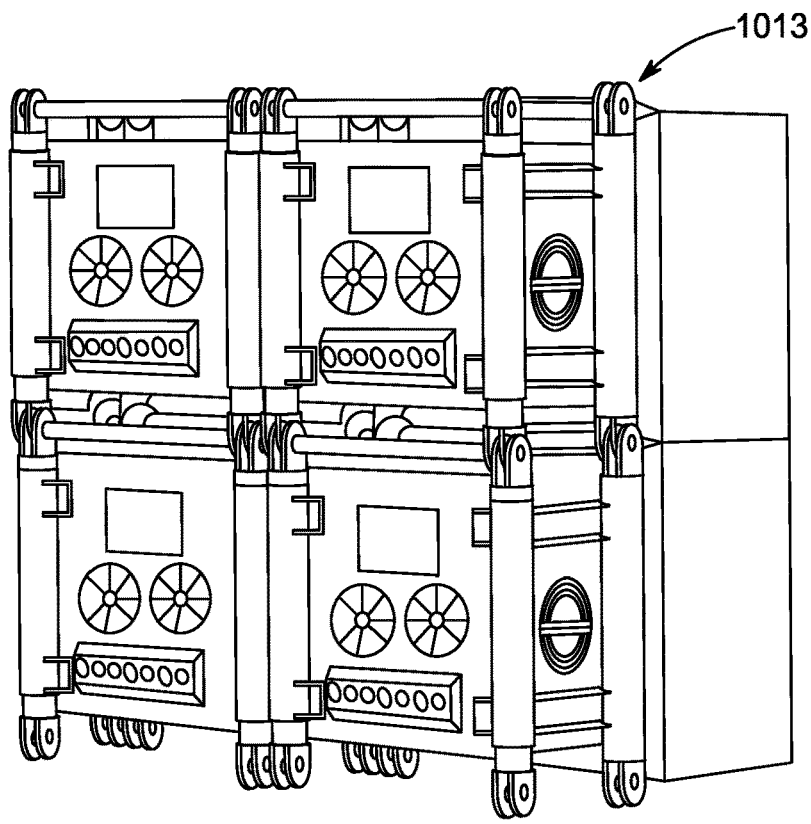
FIG. 16 shows an array of fixtures—rear perspective.

With added versatility of use, it is sometimes desired to use the device in a non-singular format as shown in FIG. 13 and FIG. 14. A rigging frame 1008 may be fitted to the device. This frame 1008 provides a positive adjustable one pivot axis rigging point 1009 in four locations, designed to enable side by side and top to bottom stacking 1011 from either a floor mounted 1012 or ceiling mounted 1013 configuration. The pivot points 1009 may be screw adjustable for accurate alignment. This rigging frame provides a structural form which carries the weight of multiple fixtures such as a maximum of twenty four (or more/less) devices. This frame interconnects to other devices as already discussed and shown in FIGS. 15 and 6 and may be fixed to the main device by means of quarter turn quick release connections 1010 known as camlocs.

Figure 17:
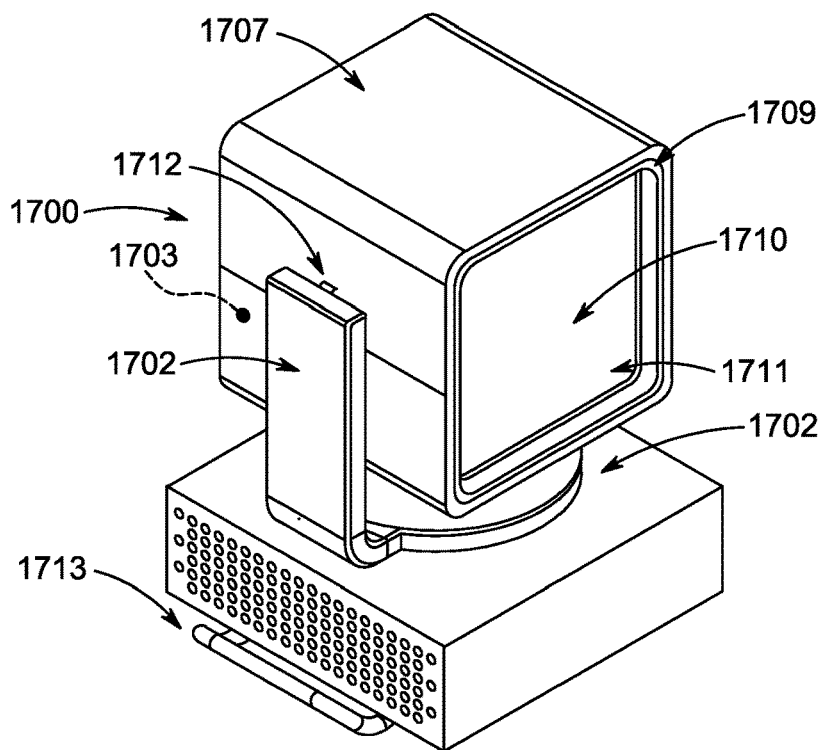
FIG. 17 shows a moving light—front perspective view.
Figure 18:
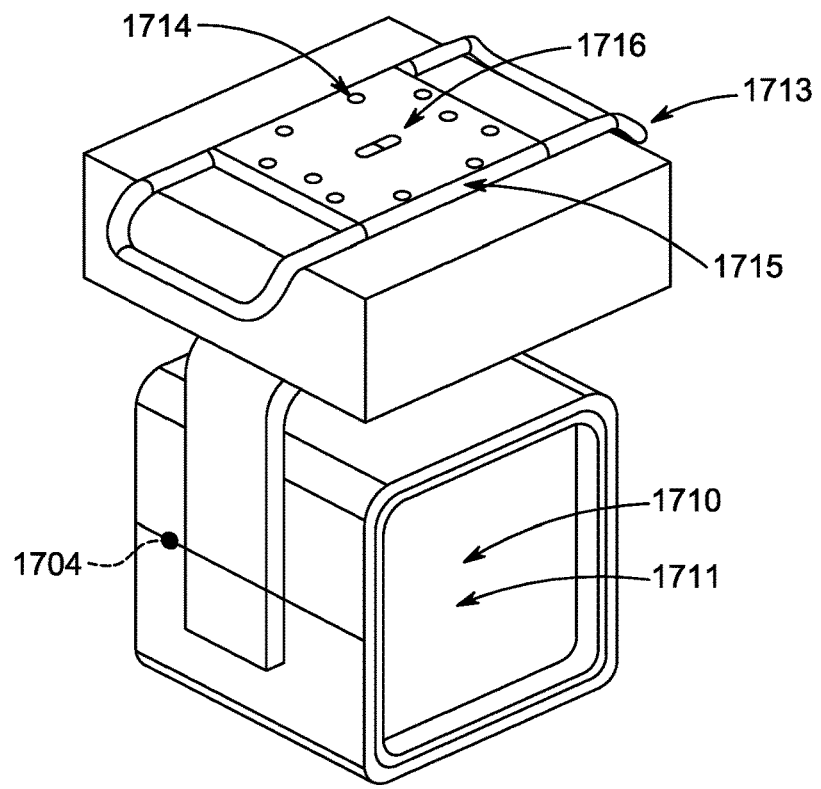
FIG. 18 shows a moving light—suspended perspective view.

The present system may also be suitable for integration as a pan and tilt moving cube as shown in FIGS. 17 and 18 whereas the two axes of movement of the cube 1700 can be controlled via digitally controlled stepper motors in the yoke 1702. These stepper motor 1703 (exposed in FIG. 26) positions may be controlled and monitored via an optical encoder wheel 1704 (exposed in FIG. 26) and infra-red optical switch, which by its nature sends feedback of the exact position of the motors. Limit switches are fitted to the maximum extents of the motorized mechanics 1705 (exposed in FIG. 26), so that at power startup the motors can position themselves into their 'home' positions.

Both of the tilt axis mechanics may be located internally 1706 within the moving cube 1700. The cube 1700 may be substantially an aluminum design with a nominally 2 mm thick outer shell 1707 and a 3 mm thick internal chassis frame 1708.

On the light emitting side of the moving cube 1700, a frame 1709 provides mechanical protection from potential hazards. A 4 mm UV stable polycarbonate optically clear protective substrate 1710 is further enhanced with a scratch resistant coating that is UV stabilized.

Set immediately behind the clear polycarbonate substrate is a Liquid Crystal Display substrate 1711. This display has a high contrast ratio of at least 3500:1. The polarizing filters to the outer (visible) face have been adapted to provide no anti-glare haze coating, thus improving the light transmission of this LCD occlusion layer.

This LCD panel is a high density no less than 960 RGB pixels by another plurality of pixels so as to achieve what is commonly referred to as high-definition video reproduction.

Figure 19:
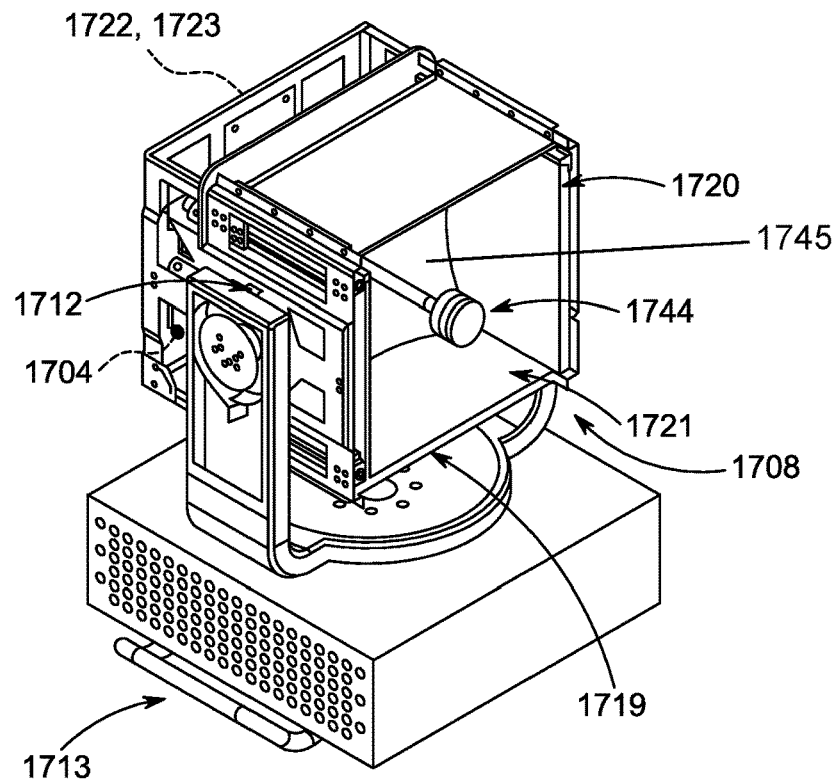
FIG. 19 shows a moving light—cut away perspective view.

The moving yoke variant shown in FIG. 19 provides the gimbal mount for both pan and tit remote-controlled attributes may be fitted with hidden locks 1712. These locks 1712 fix the display into a locked position to aid with stowage for transportation. During normal operation the locks 1712 are recessed and therefore unobtrusive to the onlooker.

To aid in the invention's aesthetics, the carry handles 1713 may located outside of the main chassis and for fixed installations it is possible to remove this as a carry cradle 1714. Quarter turn quick release camloc connections 1715 allow for omega brackets to be fitted for suspension purposes. A secondary suspension protection mount 1716 is fitted to the center of this metal cradle.

Both the pan and tilt mechanics have a spiral combined cable and water-cooling pipe and cable harness assembly which is thus designed to provide excellent strain protection for the combined pipe and cable assembly 1717. This combined pipe and cable harness assembly is designed to feed through the yoke pivot points and feeds through to the fixed base of the present invention.

The LCD panel may have an enhanced cooling method by way of an internal closed loop air flow designed to flow from the base 1719 to the top 1720 of the internal air volume of the moving cube 1700.

An internal set of aluminum panels 1721 are fitted to guide the force air from the rear of the fixture through an air gap. The air is guided across the LCD substrates rear internal facing surface. The warmer air is then extracted through the upper air gap 1720 and is recycled through the fan 1722 and radiator combination 1723 [detail in FIG. 26] where the radiant heat is extracted before being sent back through. The inner walls are finished with a nonlight reflecting surface so no indirect light is sent forwards, but rather absorbed within the confines of the inner cube.

Figure 20:
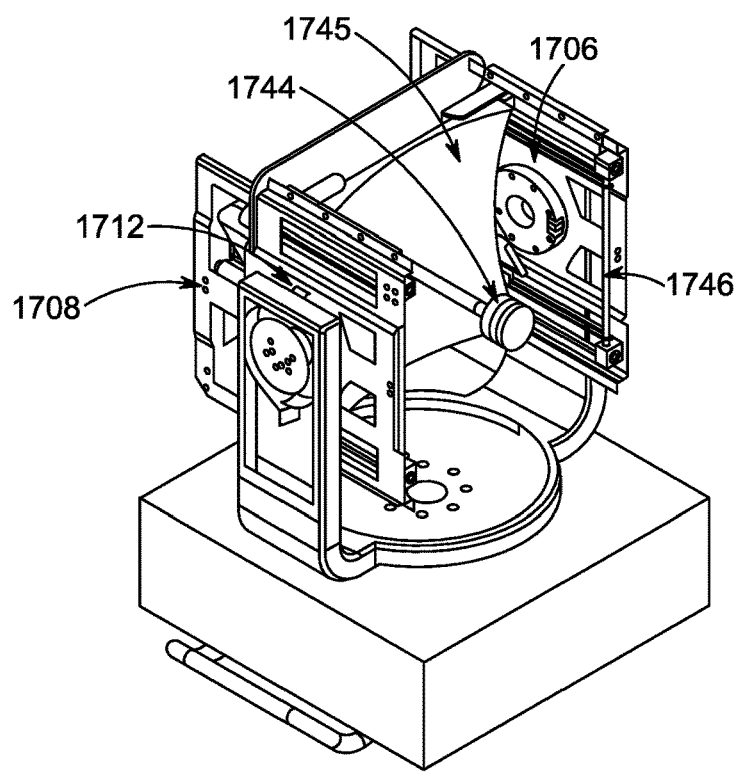
FIG. 20 shows a moving light—cut away perspective view with exposed reflector.

A parabolic or spherical or concave highly reflective reflector 1745 in FIG. 20 of >85% reflectance is engineered to a square form factor, which is mounted to two sliding mechanisms directly opposite to each other 2146. These are coupled to a timing belt and stepper motor arrangement. This reflector is designed to move rapidly either towards or away 2147 from the light source 1744.

Figure 21:
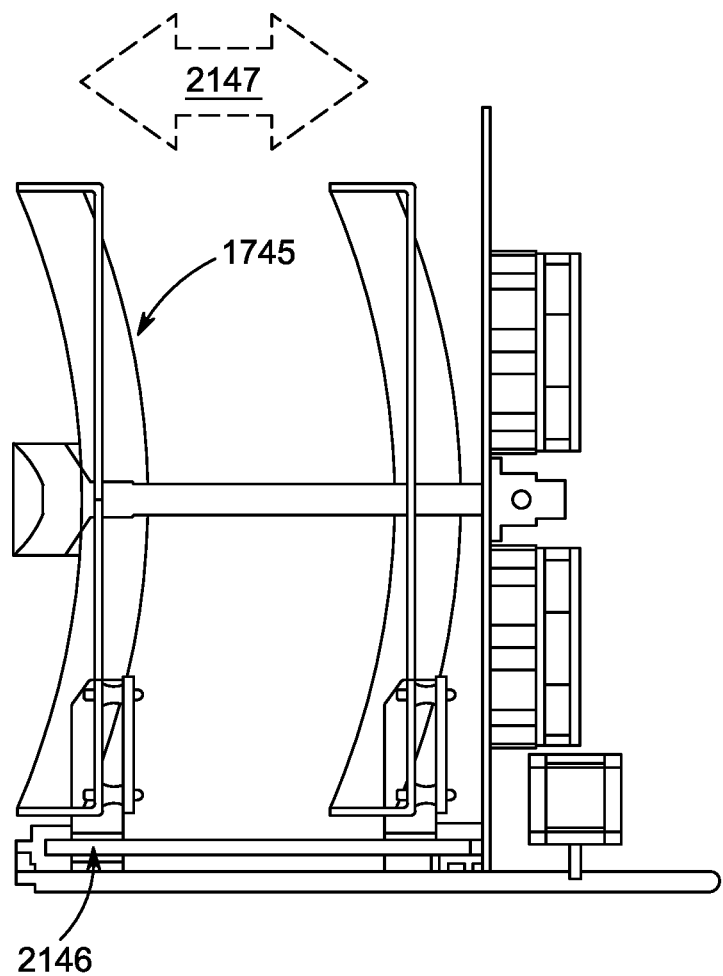
FIG. 21 shows a section through optical system.

The movement of this reflector 1745 provides a light beam zoom effect FIG. 21. This zoom can go from >60° at its widest, down to a near parallel beam which then inverts to up to >−60°. The light emitted is collimated perpendicular to the source, the resultant variable width beam of light is substantially projected forwards and by its nature through the LCD substrate 1748 continuing to produce a beam of light of which the beam can be widened or narrowed remotely via an external computer.

Figure 22:
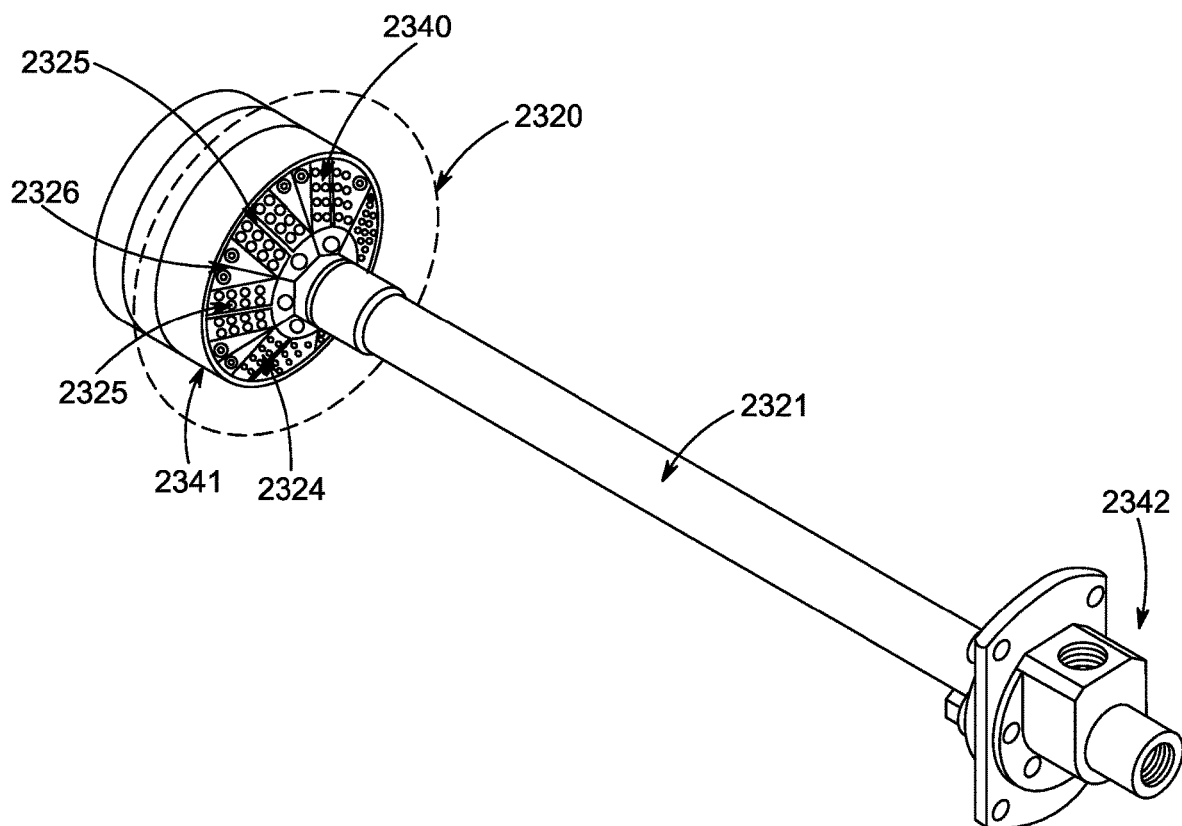
FIG. 22 shows a perspective view of LED light source.

The light source is contained in a central column shown in FIG. 22 integrating the LEDs and a thermal management system to draw heat away from the LEDs and out of the envelope between the reflector and the LCD.

The LEDs 2324 mounted on wedge shaped PCBs 2325 on the interior surface of the head block in a radial pattern 2326 and substantially behave as one cohesive light source 2320. Each segment in the light source contains multiple LED packages.

The main LED assembly may be fitted with surface mounted thermistors close to the led heat sources 2340 which provide electronic temperature sensing of each of six radial segments 2326 that are positioned in a radial pattern around the tube assembly mount. A machined lip 2341 around the head assembly catches unwanted scattered light from being visible when viewed from the front of the assembly. Further light masking provides additional light control or 'zoning'.

This light emitting assembly is connected to a column 2321 that connects via a manifold 2342 to the rest of the fixture. The manifold handles mechanical, electrical, and thermal management connections for the fixture.

This light source from a plurality of LEDs can be intensity controlled via a remote computer. Turning on the LEDS in concentric ring patterns, can also provide a wide to narrow electronic beam adjustment. When fewer LEDs are energized the light beam, becomes sharper and more defined. The more LEDS are energized the beam gives the impression of a softer more diffuse or out of focus beam of light.

Figure 23:
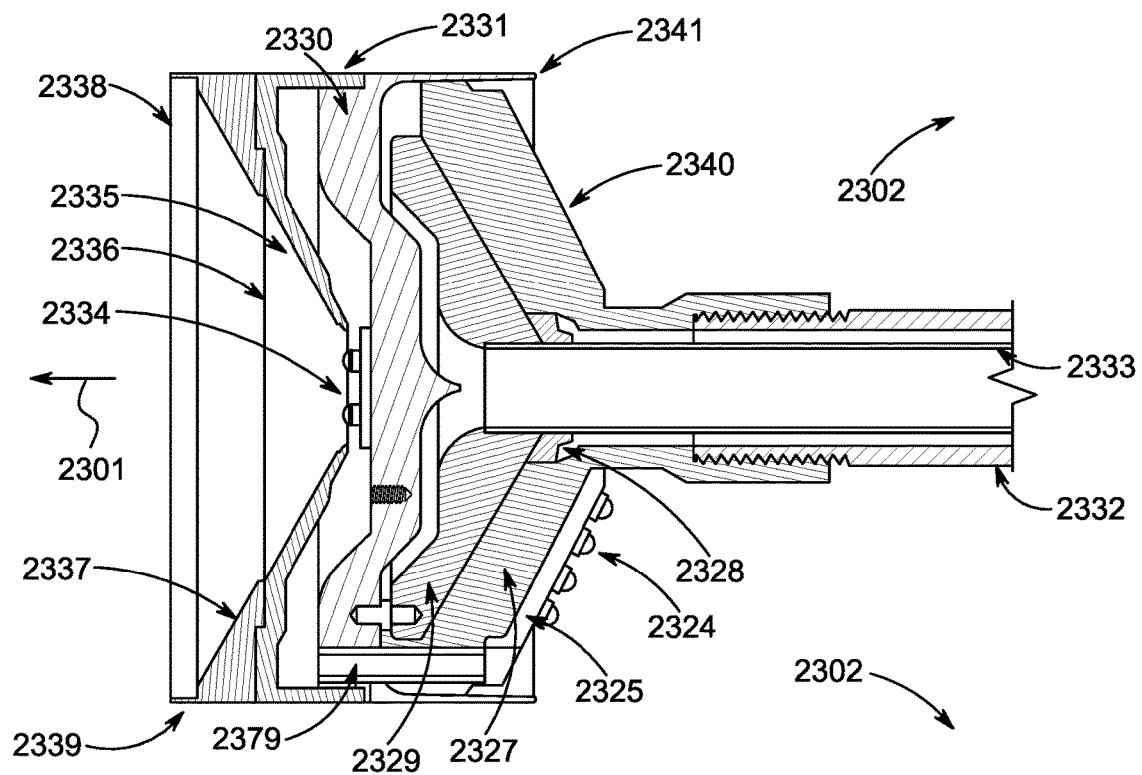
FIG. 23 shows a section of light source.

The thermal management system of the light source embedded in the mechanical design of the system in FIG. 23. Light is emitted forward toward the LCD 2301 from a small centrally mounted group of LEDs 2334 and backwards 2302 towards the reflector by the segmented array of LEDs 2324. Thermal management is handled via a sandwich of materials between these two LED groups. This section shows the way in which the LED PCBS 2325 for the array facing the reflector are mounted to a machined copper component known as the head front block 2327. This copper component 2327 on the rear, or inner is machined into radial fins 2328 and the head middle block 2329 ensures the coolant flows in the most efficient way. These fins are thus placed to provide suitable room for a cable tube to pass through 2379. The head back block 2330 is a copper component designed to seal the coolant system and acts as a heat dissipator for the forward-facing LEDs.

This liquid cooled system in by its design directly extracts the heat buildup from the LEDs, via the copper components by direct thermal conduction. This entire arrangement is soldered together at the joint 2331 to provide a watertight seal.

A ⅜" BSP steel tube 2332 is screwed into the copper head assembly arrangement and fitted within this tube is second 10 mm diameter copper connecting tube 2333. The cable tube acts as a duct to which power cable is fed through from the rear of the moving cube along the tube and through. Four high powered white LEDS 2334 are fitted to the head back block copper component.

The LED head assembly may be fitted to an inner 2333 and outer tube 2332, the two tubes are mounted to a manifold 2342, which is mounted immediately behind the center of the mechanically mobile reflector. The manifold 2342 directs coolant both in a send (center) return (outer pipe) relationship.

Figure 24:
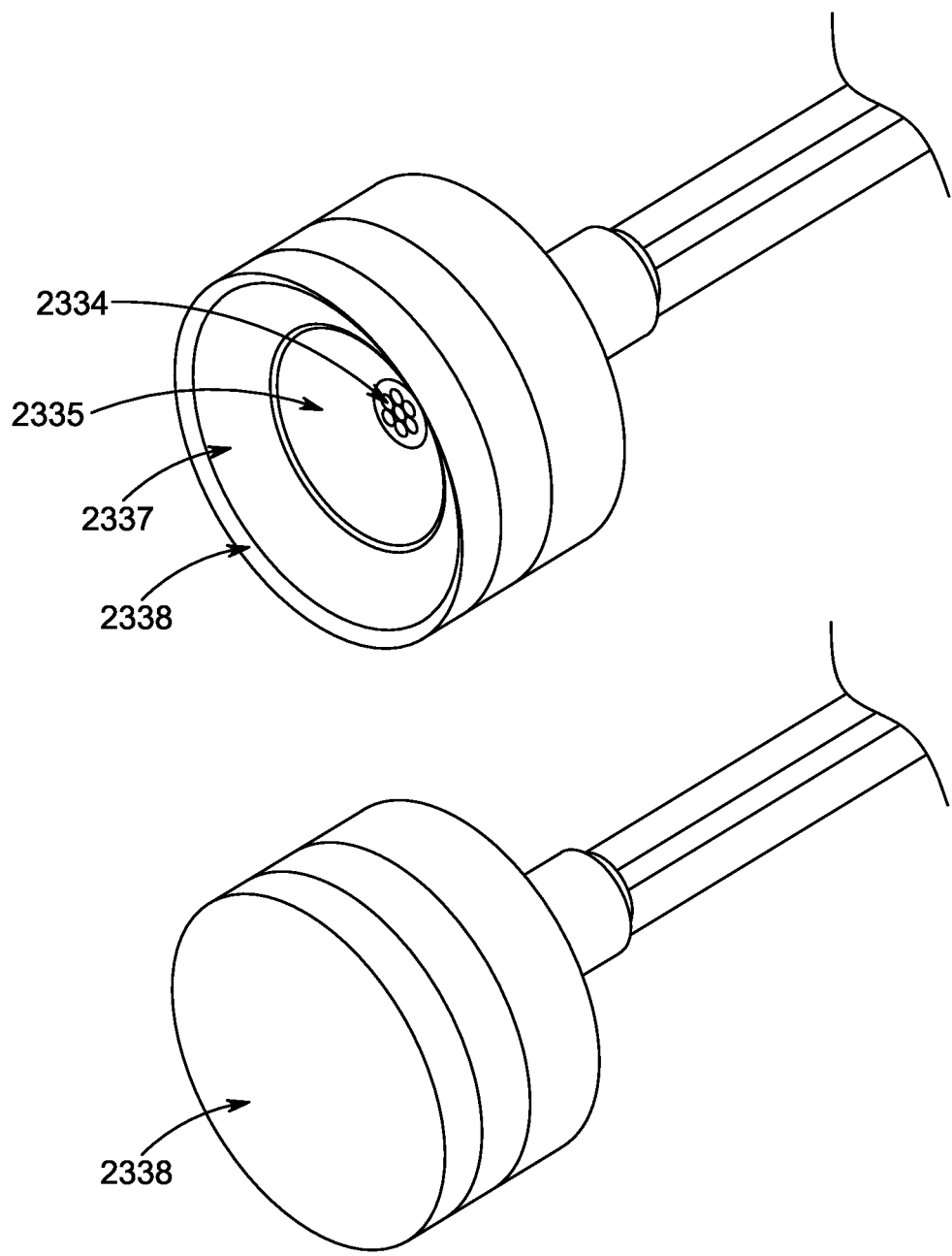
FIG. 24 shows treatment of front surface of light source.

A second conical shaped reflector 2335 may be fitted to the main head assembly as show also in FIG. 24 and by its nature provides a diffuse reflecting light surface, to which is fitted a holographic filter 2336 which acts as a light diffuser. A second smaller but substantially wider reflector 2337 continues the conical shape of the combined reflectors to provide an even more diffuse white light.

On the front of this reflector arrangement a second opalescent plastic disc 2338 may be glued into a circular recessed lip 2339 as shown in FIG. 23. The overall assembly provides a diffuse backlight that compensates for the light lost from the head assembly obstructing the main beam of light. This creates a full visual image over the surface of the LCD substrate without any loss of light intensity.

Figure 25:
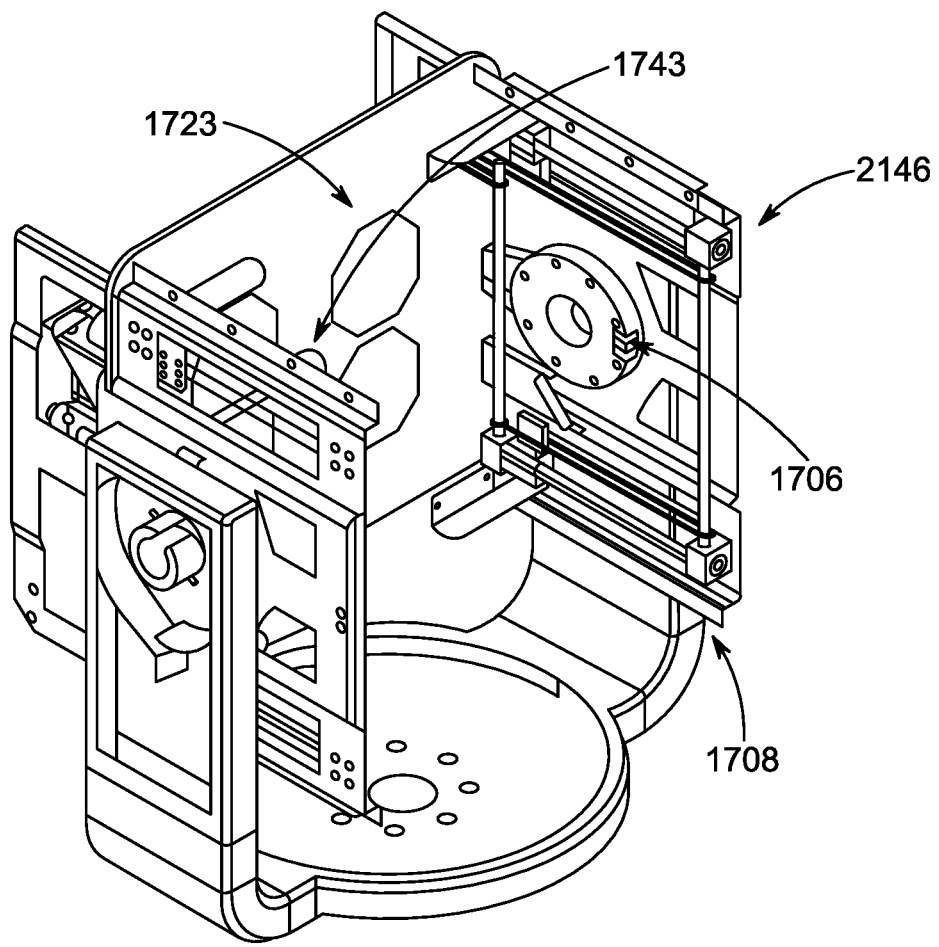
FIG. 25 shows a moving light—cut away showing cooling system.

The light source assembly connects FIG. 25 to the fixture at the rear 1743 of the cavity holding the reflector and the LCD.

Figure 26:
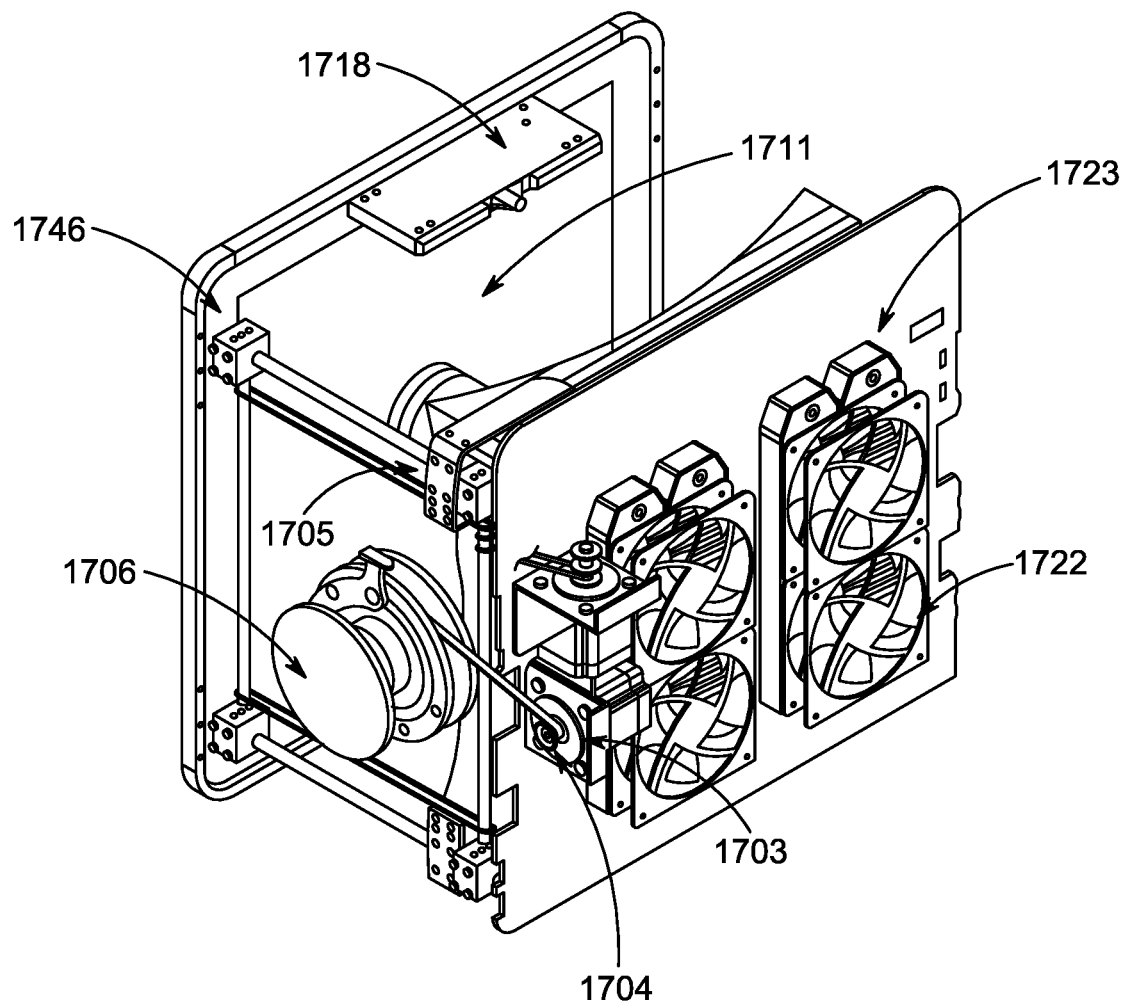
FIG. 26 shows moving light—cut away showing rear of cooling system.

The LCD panel 1711 shown in FIG. 26 is connected to a dedicated video driver 1718 that manages the external video signal and distributes data locally and provides dc power to the LCD display.

The coolant liquid is passed through the plurality of radiators 1723 using fans 1722 where needed to reduce the radiant heat buildup from the led array sealed within the cube mechanical design.

Figure 27:
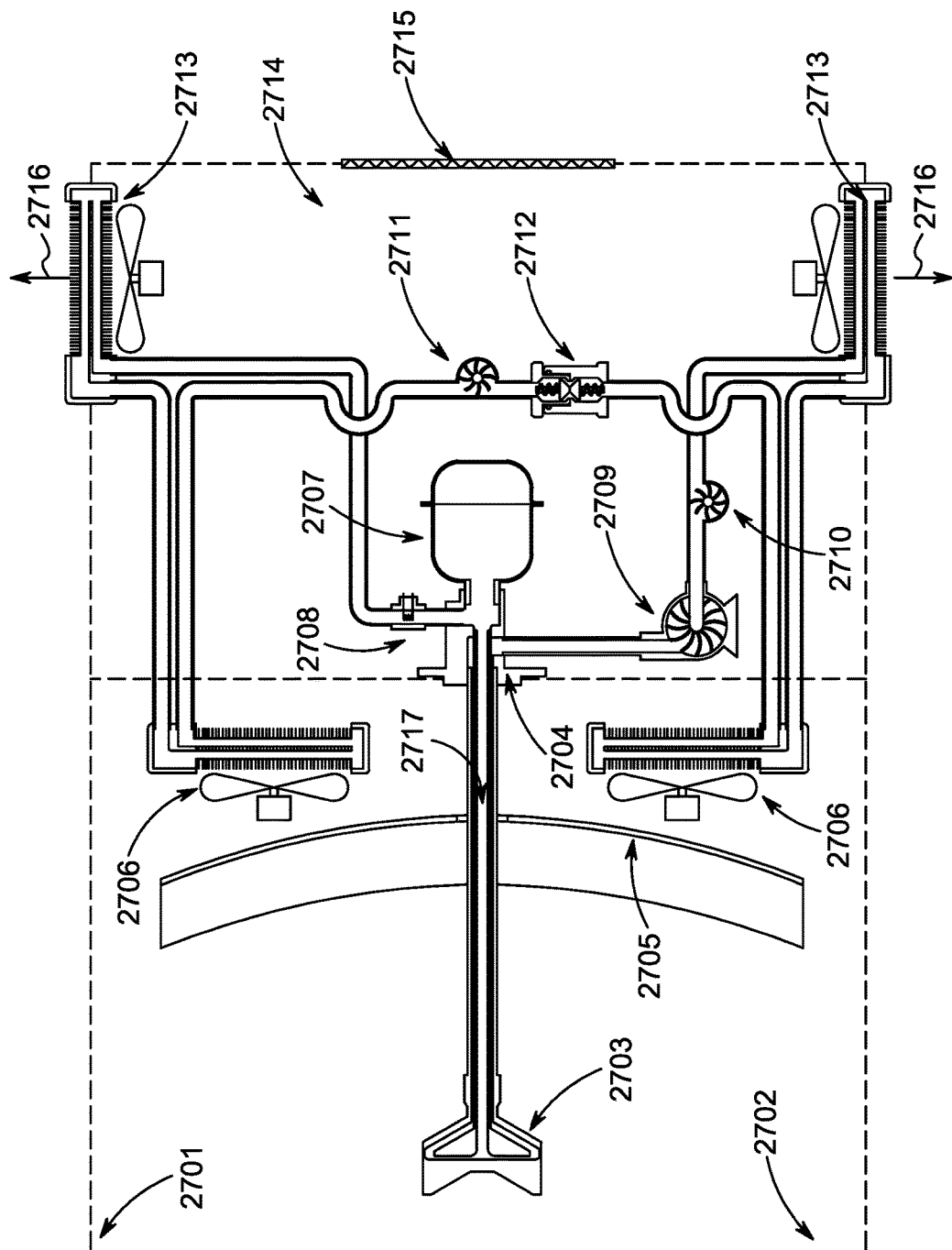
FIG. 27 shows a thermal management system.

The closed loop cooling system/thermal management system 2700 in FIG. 27 is based on a liquid coolant design removing heat from the closed volume 2701 that exists around the LCD display 2702, LED light source 2703, and the optical reflector 2705. The liquid cooling system is assisted by an internal radiator and fan 2706. The systems are connected at a manifold 2704 and includes an expansion vessel 2707 and is designed to work in any rig.

The system includes a thermal sensor 2708, a hall effect flow sensor, 2710, and a pump 2709. The system may also include a visible flow indicator 2711. A quick release connector 2712 is included for charging the system.

The system includes an arrangement of radiators 2713 required to remove heat 2716 from the system and includes openings 2714 required to draw cool air 2715 into the system.

The coolant can have additives that bring down the freeze point of the coolant to below freezing. In this embodiment we use ethanol that has a freezing point of −20° with a 5:1 ratio between water and coolant additive. Cooler temperatures are achieved by using different coolant additives and water to coolant ratios.

Figure 28:
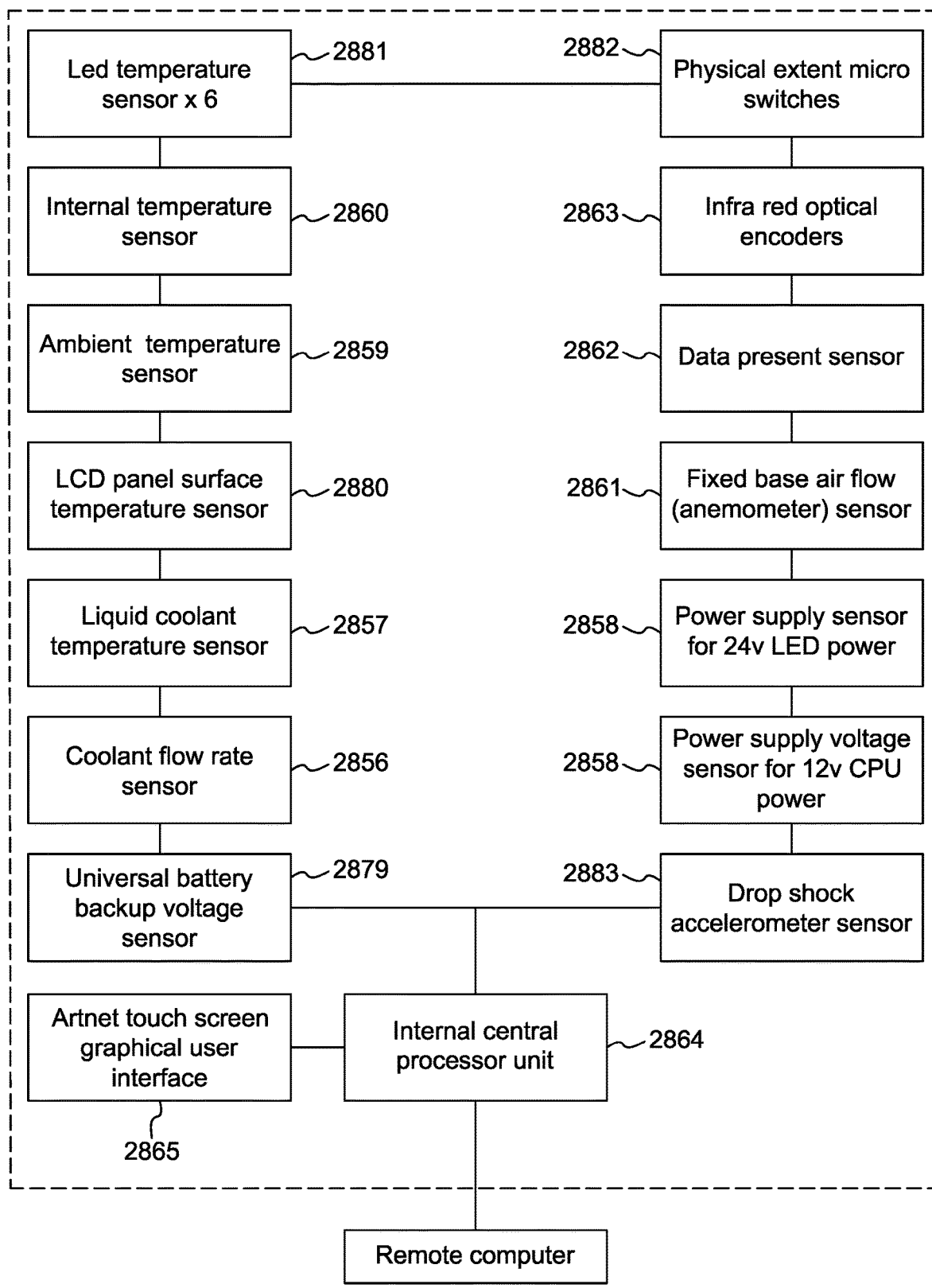
FIG. 28 shows an electronics block diagram.

The electronics system in FIG. 28 is designed with remote monitoring and sensing within the core of the system. Coolant flow rate 2856, coolant temperature 2857, LCD display temperature 2880. Power supply sensing 2858, Ambient temperature 2859, internal ambient temperature 2860. Led temperature sensor 2881, Base box airflow speed 2861, Signal present 2862, Optical encoders 2863 for all stepper motor attributes including pan tilt and zoom. switching Physical extents 2882, battery sense 2879, shock sense 2883 along with other useful operating runtime and portable appliance testing data logs to aid preventative maintenance. All sensors are processed via an internal CPU 2864.

All of the internal parameters are adjusted from this graphical user interface, along with error logging and power fail alert.

Figure 29:
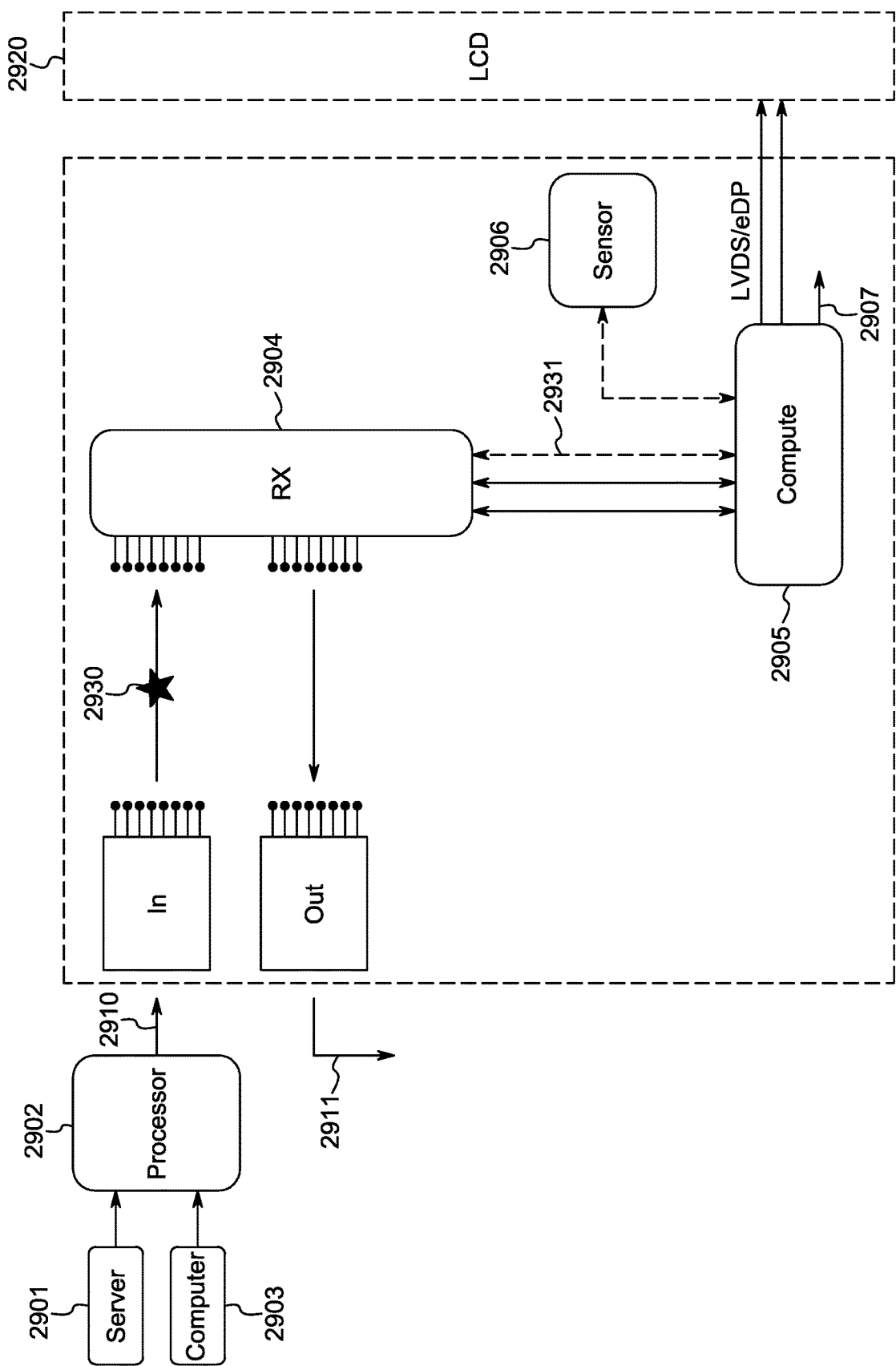
FIG. 29 shows a representation of content management.

A universal battery backup designed to provide 15 minutes or more/less of uninterrupted power may be provided in the event of mains power failure. This universal battery backup keeps the internal CPU energized along with Ethernet and DMX data flows, so that an internal fault code can be sent to the remote computer and to a remote application which works on both android and iOS operating systems. All of this information is also sent remotely back to the manufacturer's headquarters where more detailed analysis of the inventions normal operating can be monitored Each fixture may have an internal computing system for content management as shown in FIG. 29 that manages a mix of internally and externally generated sources. The external source may be a media server 2901 that is connected to a display processor 2902. The display processor acts as the primary video connection with the full system appearing to the server as a single display area. This system may be configured by locally on the processor or via an external computer 2903 such as a laptop or iPad. The connection from the processor to the lighting system may be a network cable terminating at the fixture 2910 in an RJ45 connector. The system may then allow the network cable to daisy chain to the next fixture so that a number of lights may be configured as part of a single display area. This information is unpacked by a receiver card 2904 in the lighting fixture. This card takes the portion of the display area and outputs that to the control system of the light 2905. This control system may be a computer optimized for machine vision and computing such as an NVIDIA Jetson. The system may take sensor data 2906 from a Lidar or other suitable mapping system in order to create locally generated effects at low latency. This output may be merged with the data from the receiver card 2904 in the final output to the LCD panel 2920. The servos and the light sources may also be controlled from this computing system 2907.

Remotely generated content 2930 is fed to the mapped light via the receiver card 2904 to be ingested into the locally hosted compute 2905. Content is typically fed at 24 to 60 frames per second. The receiver card 2904 delivers a clock signal 2931 to the compute system 2905 synchronizing to the output of the mapped light with the rest of the system.

Figure 30:
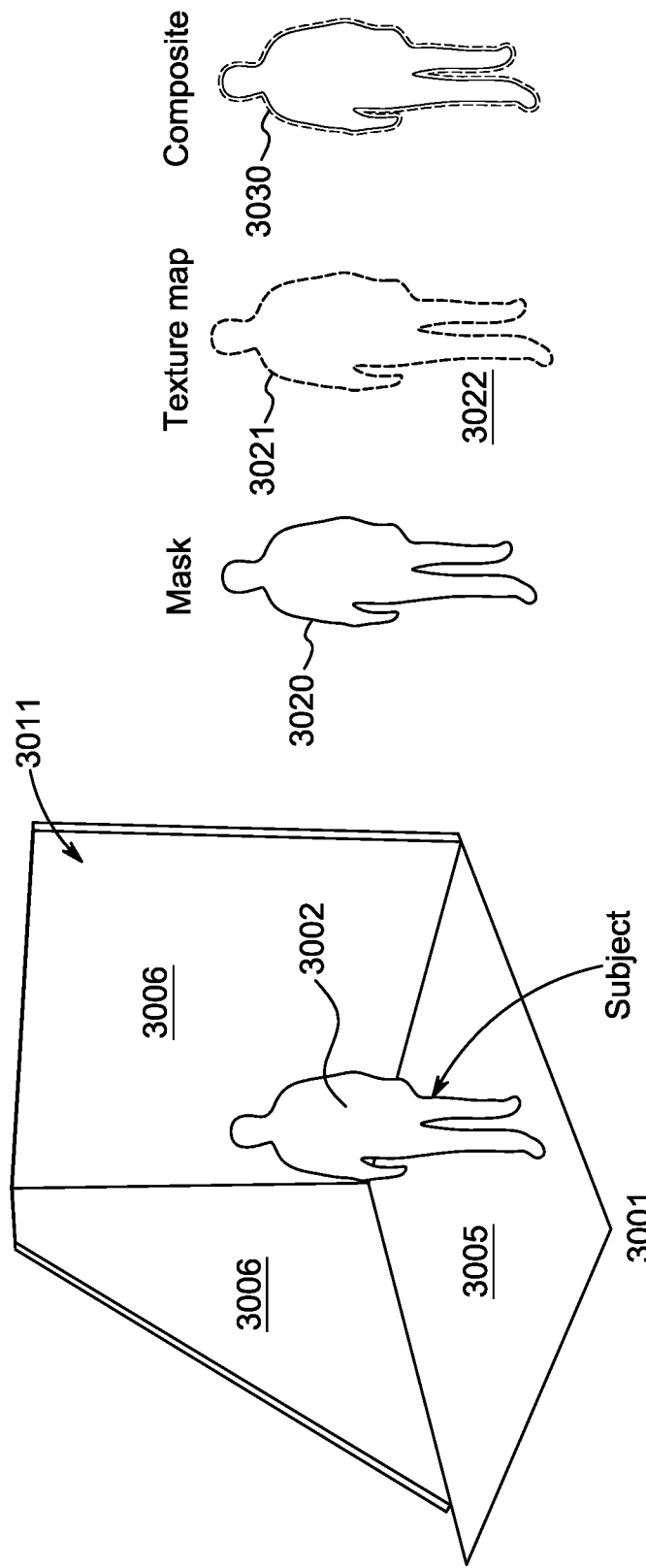
FIG. 30 shows components of a dynamic mask.

FIG. 30 shows components of a dynamic mask. A mapped light fixture in a dynamic environment 3001 that includes an LED wall 3011 and an actor 3002 may be required separate the light for the actor from the light for the LED wall or the floor 3005.

To do this, the light would need to generate a real time mask for the actor from the point of view of the mapped light fixture 3020. This mask would enable the creation of content to be mapped onto the actor 3021 and content to be mapped around the actor 3022. This could include additional separation between a wall and a floor or the floor and a physical scenic element that is on the stage. These elements are then composited together 3030 and output from the mapped light.

The LED walls 3011 may include content 3006 that includes interleaved blue or green frames used in post-production. The mapped light may be synchronized with these displays.

Figure 31:
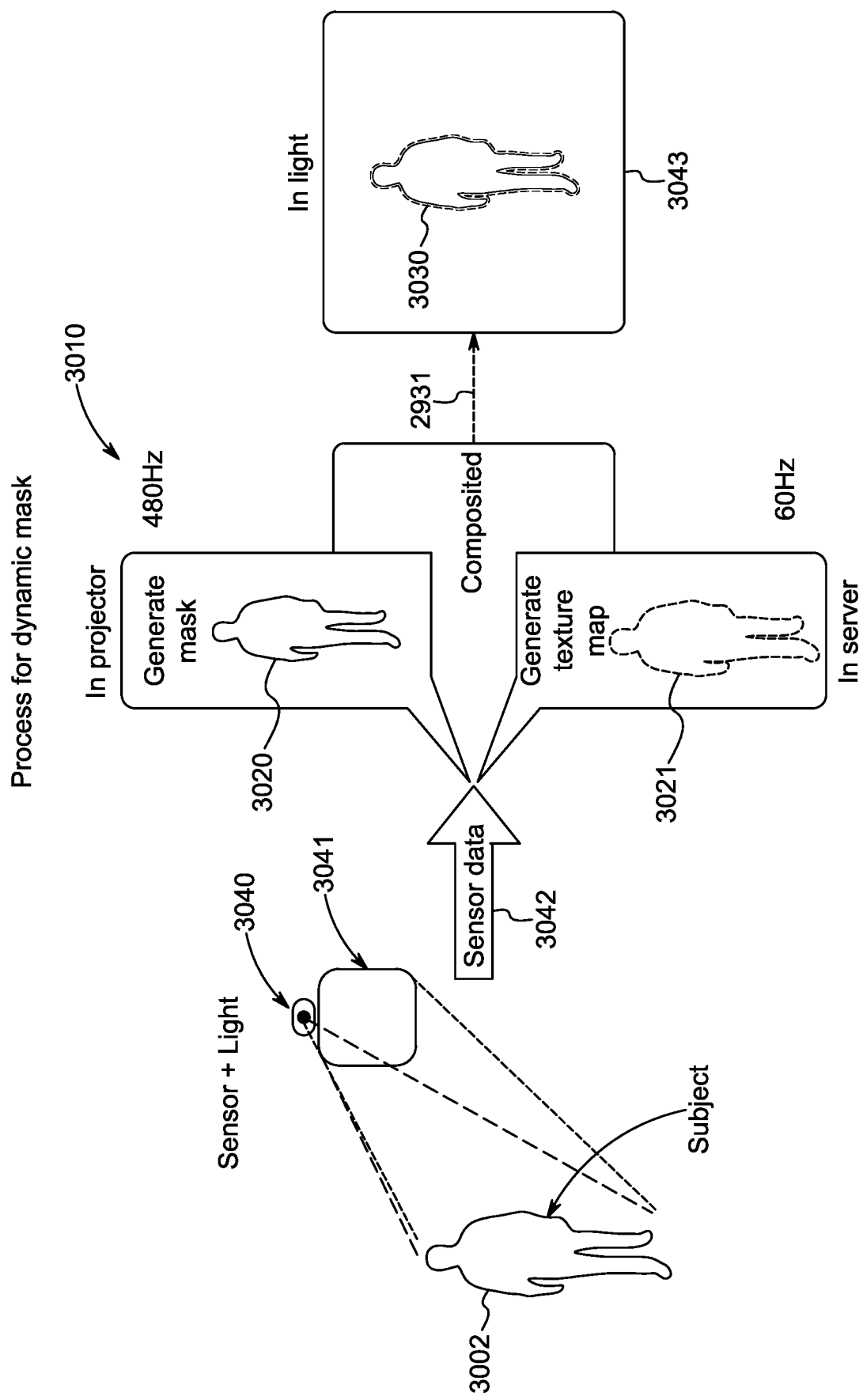
FIG. 31 shows a process for a dynamic mask.

FIG. 31 shows a process for a dynamic mask. Content mapped onto a moving person is ideally handled at a frame rate substantially above that of the camera. The output of the light may be synchronized with the camera if it is operating at a multiple of one of the popular camera frame rates including 24, 29.97, 30 frames per second. FIG. 31 uses 480 Hz 3010 and illustrates a simplified version of the workflow where the subject 3002 is mapped by a sensor 3040 mounted on the mapped light 3041. The sensor data 3042 is used to generate the mask 3020 and that is composited with the texture map 3021 to create a final output 3043 including the composited mask 3030. By compositing this locally the dynamically changing mask can be tracking the subject at 480 Hz 3010 while the data inserted into and outside of the mask can be updated at a lower frame rate.

The output of the compositing system for the mapped light is synchronized with the rest of the system 2931.

Figure 32:
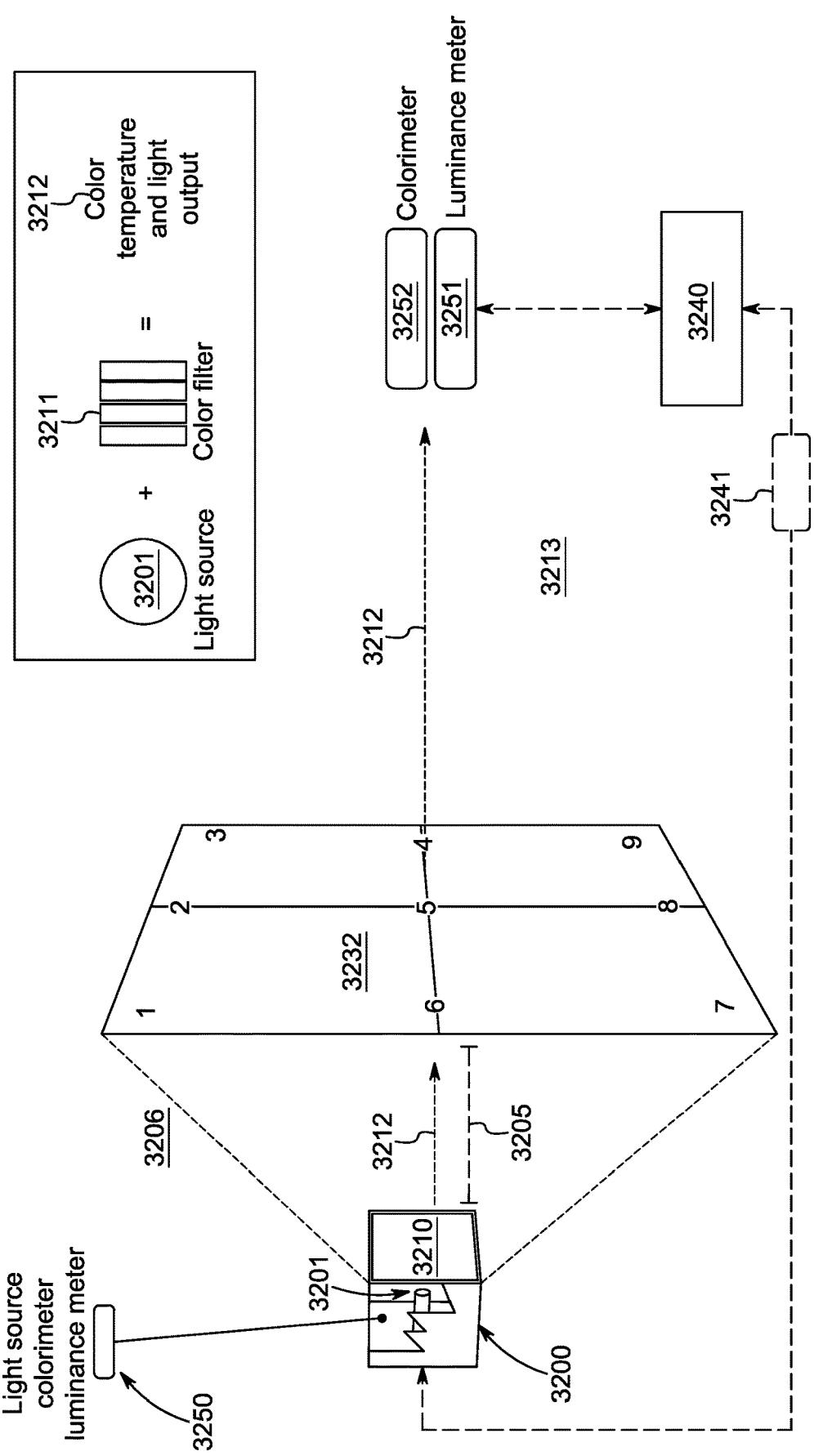
FIG. 32 shows a calibration detail

FIG. 32 shows a calibration detail where each unit 3200 can be calibrated by knowing the light source 3201 and the characteristics of the color mask 3211. A sensor can be included in each mapped lighting fixture 3250 to track the color temperature of the light source. And the color characteristics of the light filter are fixed at the time of manufacturing. The unit can also be calibrated via a closed loop system in order to minimize natural deviation in the components and processes used to fabricate the lighting system.

A closed loop system would place the mapped light system 3200 at a fixed distance 3205 to neutral diffusing screen surface 3232 such that the beam angle 3206 fills the screen surface in a manner that will be consistent for all the fixtures that are manufactured.

Light from the mapped lighting system 3212 would be diffused by the screen material and continue on into a dark non-reflective volume 3213. This light is measured by a colorimeter 3252 and a luminance meter 3251. A DSLR can also be used as part of such a system. This information is sent to a processing computer that creates a profile 3241 that is stored on the mapped lighting system.

While the invention has been described with reference to the embodiments above, a person of ordinary skill in the art may understand that various changes or modifications may be made thereto without departing from the scope of the claims.

We claim:

1. A mapped lighting system comprising:
   a liquid crystal display;
   a first controlled light source and a second controlled light source;
   a reflector that moves along a linear axis to widen; zoom; and control the angle of light beams from each of the controlled light sources, wherein movement of the reflector along the linear axis directs the light beams from the controlled light sources to the liquid crystal display;
   a thermal management system that manages heat within the light sources; and
   a source of real time data configured to generate an illumination output of each of the controlled light sources and movement of the reflector along the linear axis.

2. The mapped lighting system of claim 1, further comprising display panels, wherein the source of real time data controls the illumination and the graphical content based on each other.

3. The mapped lighting system of claim 2, wherein the source of real time data receives sensor input from a sensor and based on the sensor input, further controls the illumination and graphical content.

4. The mapped lighting system of claim 1, wherein at least one of the controlled light sources comprises a sensor located in a center of at least one of the controlled light sources.

5. The mapped lighting system of claim 4, wherein the sensor generates sensor data corresponding to the illumination output from at least one of the controlled light sources.

6. The mapped lighting system of claim 1, wherein at least one of the controlled light sources comprises a sensor located behind the center of the primary light modulator.

7. The mapped lighting system of claim 6, wherein the sensor generates sensor data corresponding to the illumination output from at least one of the controlled light sources.

8. The mapped lighting system of claim 1, wherein at least one of the controlled light sources is controllably polarized using a polarizer, wherein the polarizer can be rotated to change the output of the light source.

9. The mapped lighting system of claim 1, the output to a digital source represented in the real time data system can be replicated by an array of lights.

10. The mapped lighting system of claim 5, wherein the sensor data can be used to generate a higher density of real-time data in an active area while the illuminated area outside of that zone receives less data.

11. The mapped lighting system of claim 1, wherein a subject being illuminated is tracked by a sensor at one frequency and data received by the source of real time data is generated at two or more frequencies, wherein the source of real time data generates a mask at a high frequency and content inside the mask is generated a lower frequency.

12. The mapped lighting system of claim 1, wherein the color of the light is controlled by the color of the light source and a color filter in the light modulator and the color of the light source and the color of the color filter is established by closed loop calibration so that the color of the output can be quantified and cloned to other light sources.

13. The mapped lighting system of claim 1, wherein the source of real time data controls the light source using high frequency modulation of light wherein the output of the light sources comprise at least two different data streams that are interleaved such that the two interleaved outputs are synchronized with a sensor and another display system.

14. A mapped lighting system, the system comprising:
   a sealed enclosure containing a liquid crystal display;
   a controlled light source, wherein the controlled light source comprises a sensor;
   a reflector that moves along a linear axis to widen or zoom light from the controlled light source and direct the light to the liquid crystal display;
   a thermal management system that passes air across a back of the liquid crystal display, wherein the thermal management system has a heat exchanger to remove heat from the sealed enclosure; and
   a source of real time data configured to generate an illumination output of each of the controlled light sources and movement of the reflector along the axis;
   wherein the sensor generates sensor data corresponding to an illumination output from the controlled light source and provides the sensor data to the source of real time data.

15. The mapped lighting system of claim 1, wherein the reflector is located between the light sources and the thermal management system.

16. The mapped lighting system of claim 4, wherein the sensor is directed at a subject of the mapped lighting system.

17. The mapped lighting system of claim 5, wherein the sensor is directed at a subject of the mapped lighting system.

18. The mapped lighting system of claim 6, wherein the sensor is directed at a subject of the mapped lighting system.

19. The mapped lighting system of claim 1, comprising a head front block that acts as a heat dissipater for each light source, wherein the head front block is located between each light source and the liquid crystal display.

* * * * *